(12) United States Patent
Wang et al.

(10) Patent No.: US 11,119,272 B2
(45) Date of Patent: Sep. 14, 2021

(54) HYBRID SILICON-TRANSPARENT CONDUCTIVE OXIDE DEVICES

(71) Applicant: OREGON STATE UNIVERSITY, Corvallis, OR (US)

(72) Inventors: Alan Xiaolong Wang, Corvallis, OR (US); Erwen Li, Corvallis, OR (US)

(73) Assignee: OREGON STATE UNIVERSITY, Corvallis, OR (US)

( * ) Notice: Subject to any disclaimer, the term of this patent is extended or adjusted under 35 U.S.C. 154(b) by 0 days.

(21) Appl. No.: 17/069,920

(22) Filed: Oct. 14, 2020

(65) Prior Publication Data

US 2021/0141152 A1 May 13, 2021

Related U.S. Application Data

(60) Provisional application No. 62/933,543, filed on Nov. 11, 2019.

(51) Int. Cl.
*G02B 6/12* (2006.01)
*H04J 14/02* (2006.01)
*G02B 6/293* (2006.01)

(52) U.S. Cl.
CPC ..... *G02B 6/12007* (2013.01); *G02B 6/29338* (2013.01); *H04J 14/022* (2013.01); *G02B 2006/121* (2013.01); *G02B 2006/12164* (2013.01)

(58) Field of Classification Search
None
See application file for complete search history.

(56) References Cited

U.S. PATENT DOCUMENTS

| 2004/0021193 | A1 | 2/2004 | Menachem | |
|---|---|---|---|---|
| 2013/0011139 | A1* | 1/2013 | Hardy | H04B 10/801 398/79 |
| 2015/0055910 | A1* | 2/2015 | Liang | G02B 6/125 385/2 |
| 2017/0045762 | A1* | 2/2017 | Huang | G02F 1/025 |

OTHER PUBLICATIONS

Richard Soref, The Past, Present, and Future of Silicon Photonics.; IEEE J. Sel. Top. Quant. 2006, 12, 1678-1687.
Cheng, Q., Bahadori, M., Glick, M., Rumley, S. and Bergman, K., 2018. Recent advances in optical technologies for data centers: a review.Optica,5(11), pp. 1354-1370.
Nikolova, D., Rumley, S., Calhoun, D., Li, Q., Hendry, R., Samadi, P. and Bergman, K., 2015. Scaling silicon photonic switch fabrics for data center interconnection networks.Optics express,23(2), pp. 1159-1175.
Chen, J., Gong, Y., Fiorani, M. and Aleksic, S., 2015. Optical interconnects at the top of the rack for energy-efficient data centers. IEEE Communications Magazine,53(8), pp. 140-148.

(Continued)

*Primary Examiner* — Chad H Smith
(74) *Attorney, Agent, or Firm* — Niels Haun; Dann, Dorfman, Herrell & Skillman, P.C.

(57) ABSTRACT

Electrically tunable hybrid silicon-transparent conductive oxide (Si-TCO) devices, such as dual-electrode micro-ring resonators and micro-disks for large-scale on-chip wavelength division multiplexing optical interconnects.

12 Claims, 15 Drawing Sheets

(56) References Cited

OTHER PUBLICATIONS

Sato, K.I., 2018. Realization and application of large-scale fast optical circuit switch for data center networking. Journal of Lightwave Technology, 36(7), pp. 1411-1419.
Li, Y., Zhang, Y., Zhang, L. and Poon, A.W., 2015. Silicon and hybrid silicon photonic devices for intra-datacenter applications: state of the art and perspectives. Photonics Research, 3(5), pp. B10-B27.
Thomson, D., Zilkie, A., Bowers, J.E., Komljenovic, T., Reed, G.T., Vivien, L., Marris-Morini, D., Cassan, E., Virol, L., Fádéli, J.M. and Hartmann, J.M., 2016. Roadmap on silicon photonics. Journal of Optics, 18(7), p. 073003.
Komljenovic, T., Davenport, M., Hulme, J., Liu, A.Y., Santis, C.T., Spott, A., Srinivasan, S., Stanton, E.J., Zhang, C. and Bowers, J.E., 2016. Heterogeneous silicon photonic integrated circuits. Journal of Lightwave Technology, 34(1), pp. 20-35.
Testa, et al. 2016. Silicon photonics iii. Topics in applied physics, pp. 421-446.
Soref, R.I.C.H.A.R.D.A. and Bennett, B.R.I.A.N.R., 1987. Electrooptical effects in silicon. IEEE journal of quantum electronics, 23(1), pp. 123-129.
Soref, R.A., 1993. Silicon-based optoelectronics. Proceedings of the IEEE, 81(12), pp. 1687-1706.
Soref, R., 2010. Silicon photonics: a review of recent literature. Silicon, 2(1), pp. 1-6.
Bogaerts, W., De Heyn, P., Van Vaerenbergh, T., De Vos, K., Kumar Selvaraja, S., Claes, T., Dumon, P., Bienstman, P., Van Thourhout, D. and Baets, R., 2012. Silicon microring resonators. Laser & Photonics Reviews, 6(1), pp. 47-73.
Chen, S., Li, W., Wu, J., Jiang, Q., Tang, M., Shutts, S., Elliott, S.N., Sobiesierski, A., Seeds, A.J., Ross, I. and Smowton, P.M., 2016. Electrically pumped continuous-wave III-V quantum dot lasers on silicon. Nature Photonics, 10(5), p. 307.
Hiraki, T., Aihara, T., Hasebe, K., Takeda, K., Fujii, T., Kakitsuka, T., Tsuchizawa, T., Fukuda, H. and Matsuo, S., 2017. Heterogeneously integrated III-V/Si MOS capacitor Mach-Zehnder modulator. Nature Photonics, 11 (8), p. 482.
Phare, C.T., Lee, Y.H.D., Cardenas, J. and Lipson, M., 2015. Graphene electro-optic modulator with 30 GHz bandwidth. Nature Photonics, 9(8), p. 511.
Ye, S.W., Yuan, F., Zou, X.H., Shah, M.K., Lu, R.G. and Liu, Y., 2017. High-speed optical phase modulator based on graphene-silicon waveguide. IEEE Journal of Selected Topics in Quantum Electronics, 23(1), pp. 76-80.
Gao, Y., Shiue, R.J., Gan, X., Li, L., Peng, C., Meric, I., Wang, L., Szep, A., Walker Jr, D., Hone, J. and Englund, D., 2015. High-speed electro-optic modulator integrated with graphene-boron nitride heterostructure and photonic crystal nanocavity. Nano letters, 15(3), pp. 2001-2005.
Lin, C.Y., Wang, X., Chakravarty, S., Lee, B.S., Lai, W., Luo, J., Jen, A.K.Y. and Chen, R.T., 2010. Electro-optic polymer infiltrated silicon photonic crystal slot waveguide modulator with 23 dB slow light enhancement. Applied Physics Letters, 97(9), p. 194.
Wolf, S., Zwickel, H., Hartmann, W., Lauermann, M., Kutuvantavida, Y., Kieninger, C., Altenhain, L., Schmid, R., Luo, J., Jen, A.K.Y. and Randel, S., 2018. Silicon-organic hybrid (SOH) Mach-Zehnder modulators for 100 Gbit/s on-off keying. Scientific reports, 8(1), p. 2598.
Mercante, A.J., Yao, P., Shi, S., Schneider, G., Murakowski, J. and Prather, D.W., 2016. 110 GHz CMOS compatible thin film LiNbO3 modulator on silicon. Optics express, 24(14), pp. 15590-15595.
Chen, L., Xu, Q., Wood, M.G. and Reano, R.M., 2014. Hybrid silicon and lithium niobate electro-optical ring modulator. Optica, 1(2), pp. 112-118.
Xiong, C., Pernice, W.H., Ngai, J.H., Reiner, J.W., Kumah, D., Walker, F.J., Ahn, C.H. and Tang, H.X., 2014. Active silicon integrated nanophotonics: ferroelectric BaTiO3 devices. Nano letters, 14(3), pp. 1419-1425.

Markov, P., Appavoo, K., Haglund, R.F. and Weiss, S.M., 2015. Hybrid Si-VO 2-Au optical modulator based on near-field plasmonic coupling. Optics express, 23(5), pp. 6878-6887.
Yu, Z., Zheng, J., Xu, P., Zhang, W. and Wu, Y., 2018. Ultracompact Electro-Optical Modulator-Based Ge 2 Sb 2 Te 5 on Silicon. IEEE Photonics Technology Letters, 30(3), pp. 250-253.
Wu, C., Yu, H., Li, H., Zhang, X., Takeuchi, I. and Li, M., 2018. Low-Loss Integrated Photonic Switch Using Subwavelength Patterned Phase Change Material. ACS Photonics, 6(1), pp. 87-92.
Naik, G.V., Kim, J. and Boltasseva, A., 2011. Oxides and nitrides as alternative plasmonic materials in the optical range. Optical Materials Express, 1(6), pp. 1090-1099.
Babicheva, V.E., Boltasseva, A. and Lavrinenko, A.V., 2015. Transparent conducting oxides for electro-optical plasmonic modulators. Nanophotonics, 4(1), pp. 165-185.
Ma, Z., Li, Z., Liu, K., Ye, C. and Sorger, V.J., 2015. Indium-tin-oxide for high-performance electro-optic modulation. Nanophotonics, 4(1), pp. 198-213.
Huang, Y.W., Lee, H.W.H., Sokhoyan, R., Pala, R.A., Thyagarajan, K., Han, S., Tsai, D.P. and Atwater, H.A., 2016. Gate-tunable conducting oxide metasurfaces. Nano letters, 16(9), pp. 5319-5325.
Wood, M.G., Campione, S., Parameswaran, S., Luk, T.S., Wendt, J.R., Serkland, D.K. and Keeler, G.A., 2018. Gigahertz speed operation of epsilon-near-zero silicon photonic modulators. Optica, 5(3), pp. 233-236.
Hoshino, K., Hong, D., Chiang, H.Q. and Wager, J.F., 2009. Constant-voltage-bias stress testing of a-IGZO thin-film transistors. IEEE Transactions on Electron Devices, 56(7), pp. 1365-1370.
Hoffman, R.L., Norris, B.J. and Wager, J.F., 2003. ZnO-based transparent thin-film transistors. Applied Physics Letters, 82(5), pp. 733-735.
Ellmer, K., 2012. Past achievements and future challenges in the development of optically transparent electrodes. Nature Photonics, 6(12), p. 809.
Xu, Q., Manipatruni, S., Schmidt, B., Shakya, J. and Lipson, M., 2007. 12.5 Gbit/s carrier-injection-based silicon micro-ring silicon modulators. Optics express, 15(2), pp. 430-436.
Li, C., Zhou, L. and Poon, A.W., 2007. Silicon microring carrier-injection-based modulators/switches with tunable extinction ratios and OR-logic switching by using waveguide cross-coupling. Optics express, 15(8), pp. 5069-5076.
Liu, A., Liao, L., Rubin, D., Nguyen, H., Ciftcioglu, B., Chetrit, Y., Izhaky, N. and Paniccia, M., 2007. High-speed optical modulation based on carrier depletion in a silicon waveguide. Optics Express, 15(2), pp. 660-668.
Watts, M.R., Zortman, W.A., Trotter, D.C., Young, R.W. and Lentine, A.L., 2010. Low-voltage, compact, depletion-mode, silicon Mach-Zehnder modulator. IEEE Journal of Selected Topics in Quantum Electronics, 16(1), pp. 159-164.
Liu, A., Jones, R., Liao, L., Samara-Rubio, D., Rubin, D., Cohen, O., Nicolaescu, R. and Paniccia, M., 2004. A high-speed silicon optical modulator based on a metal-oxide-semiconductor capacitor. Nature, 427(6975), p. 615.
Van Campenhout, J., Pantouvaki, M., Verheyen, P., Selvaraja, S., Lepage, G., Yu, H., Lee, W., Wouters, J., Goossens, D., Moelants, M. and Bogaerts, W., 2012, March. Low-voltage, low-loss, multi-Gb/s silicon micro-ring modulator based on a MOS capacitor. In Optical Fiber Communication Conference and Exposition (OFC/NFOEC), 2012 and the National Fiber Optic Engineers Conference (pp. 1-3). IEEE.
Liao, L., Samara-Rubio, D., Morse, M., Liu, A., Hodge, D., Rubin, D., Keil, U.D. and Franck, T., 2005. High speed silicon Mach-Zehnder modulator. Optics Express, 13(8), pp. 3129-3135.
Liu, M., Yin, X., Ulin-Avila, E., Geng, B., Zentgraf, T., Ju, L., Wang, F. and Zhang, X., 2011. A graphene-based broadband optical modulator. Nature, 474(7349), p. 64.
Youngblood, N., Anugrah, Y., Ma, R., Koester, S.J. and Li, M., 2014. Multifunctional graphene optical modulator and photodetector integrated on silicon waveguides. Nano letters, 14(5), pp. 2741-2746.
Briggs, R.M., Pryce, I.M. and Atwater, H.A., 2010. Compact silicon photonic waveguide modulator based on the vanadium dioxide metal-insulator phase transition. Optics express, 18(11), p. 11192-11201.

(56) References Cited

OTHER PUBLICATIONS

Naik, G.V., Shalaev, V.M. and Boltasseva, A., 2013. Alternative plasmonic materials: beyond gold and silver. Advanced Materials, 25(24), pp. 3264-3294.
Lee, H.W., Papadakis, G., Burgos, S.P., Chander, K., Kriesch, A., Pala, R., Peschel, U. and Atwater, H.A., 2014. Nanoscale conducting oxide PlasMOStor. Nano letters, 14(11), pp. 6463-6468.
Chiang, H.Q., Wager, J.F., Hoffman, R.L., Jeong, J. and Keszler, D.A., 2005. High mobility transparent thin-film transistors with amorphous zinc tin oxide channel layer. Applied Physics Letters, 86(1), p. 013503.
Feigenbaum, E., Diest, K. and Atwater, H.A., 2010. Unity-order index change in transparent conducting oxides at visible frequencies. Nano letters, 10(6), pp. 2111-2116.
Vasudev, A.P., Kang, J.H., Park, J., Liu, X. and Brongersma, M.L., 2013. Electro-optical modulation of a silicon waveguide with an "epsilon-near-zero" material. Optics express, 21(22), pp. 26387-26397.
Lu, Z., Zhao, W. and Shi, K., 2012. Ultracompact electroabsorption modulators based on tunable epsilon-near-zero-slot waveguides. IEEE Photonics Journal, 4(3), pp. 735-740.
Mondon, F. and Blonkowski, S., 2003. Electrical characterisation and reliability of HfO2 and Al2O3-HfO2 MIM capacitors. Microelectronics Reliability, 43(8), pp. 1259-1266.
Huang, T.C., Li, C., Wu, R., Chen, C.H., Fiorentino, M., Cheng, K.T., Palermo, S. and Beausoleil, R., Aug. 2015. DWDM nanophotonic interconnects: toward terabit/s chip-scale serial link. In Circuits and Systems (MWSCAS), 2015 IEEE 58th International Midwest Symposium on (pp. 1-4). IEEE.
G. Li, X. Zheng, J. Yao, H. Thacker, I. Shubin, Y. Luo, K. Raj, J. E. Cunningham, and A. V. Krishnamoorthy, "25Gb/s 1V-driving CMOS ring modulator with integrated thermal tuning," Opt. Express 19,20435 (2011).
P. Dong, S. Liao, D. Feng, H. Liang, D. Zheng, R. Shafiiha, C.-C. Kung, W. Qian, G. Li, X. Zheng, A. V. Krishnamoorthy, and M. Asghari, "Low V_pp, ultralow-energy, compact, high-speed silicon electro-optic modulator," Opt. Express 17, 22484 (2009).
O. Dubray, S. Menezo, B. Blampey, P. Le Maitre, J. F. Carpentier, B. Ben Bakir, M. Fournier, and S. Messaoudéne, "20Gb/s PAM-4 Transmission from 35 to 90° C by modulating a Silicon Ring Resonator Modulator with 2Vpp," in Optical Fiber Communication Conference (OSA, 2015), p. W2A.31.
R. Dubé-Demers, S. LaRochelle, and W. Shi, "Ultrafast pulse-amplitude modulation with a femtojoule silicon photonic modulator," Optica (2016).
J. F. Buckwaiter, X. Zheng, G. Li, K. Raj, and A. V. Krishnamoorthy, "A Monolithic 25-GB/s Transceiver With Photonic Ring Modulators and Ge Detectors in a 130-nm CMOS SOI Process," IEEE J. Solid-State Circuits 47, 1309-1322 (2012).
O. Dubray, M. A. Seyedi, C. H. Chen, B. Charbonnier, A. Descos, M. Fiorentino, R. G. Beausoleil, and S. Menezo, "30Gbit/s PAM-4 transmission by modulating a dual silicon ring resonator modulator," in 2016 IEEE Optical Interconnects Conference (OI) (IEEE, 2016), pp. 6-7.
X. Xiao, H. Xu, X. Li, Y. Hu, K. Xiong, Z. Li, T. Chu, Y. Yu, and J. Yu, "25 Gbit/s silicon microring modulator based on misalignment-tolerant interleaved PN junctions," Opt. Express 20, 2507 (2012).
Z. Yong, W. D. Sacher, Y. Huang, J. C. Mikkelsen, Y. Yang, X. Luo, P. Dumais, D. Goodwill, H. Bahrami, P. G.-Q. Lo, E. Bernier, and J. K. S. Poon, "U-shaped PN junctions for efficient silicon Mach-Zehnder and microring modulators in the O-band," Opt. Express 25, 8425 (2017).
S. Manipatruni, R. K. Dokania, B. Schmidt, N. Sherwood-Droz, C. B. Poitras, A. B. Apsel, and M. Lipson, "Wide temperature range operation of micrometer-scale silicon electro-optic modulators," Opt. Lett. 33,2185 (2008).
K. Padmaraju, D. F. Logan, X. Zhu, J. J. Ackert, A. P. Knights, and K. Bergman, "Integrated thermal stabilization of a microring modulator," Opt. Express 21,14342 (2013).

F. Gan, T. Barwicz, M. A. Popovic, M. S. Dahlem, C. W. Holzwarth, P. T. Rakich, H. I. Smith, E. P. Ippen, and F. X. Kartner, "Maximizing the Thermo-Optic Tuning Range of Silicon Photonic Structures," in 2007 Photonics in Switching (IEEE, 2007), pp. 67-68.
Timurdogan, E., Sorace-Agaskar, C.M., Sun, J., Hosseini, E.S., Biberman, A. and Watts, M.R., 2014. An ultralow power athermal silicon modulator. Nature communications, 5, p. 4008.
Ying, Z., Wang, Z., Zhao, Z., Dhar, S., Pan, D.Z., Soref, R. and Chen, R.T., 2018. Comparison of microrings and microdisks for high-speed optical modulation in silicon photonics. Applied Physics Letters, 112(11), p. 111108.
Dubé-Demers, R., St-Yves, J., Bois, A., Zhong, Q., Caverley, M., Wang, Y., Chrostowski, L., LaRochelle, S., Plant, D.V. and Shi, W., 2015. Analytical modeling of silicon microring and microdisk modulators with electrical and optical dynamics. Journal of Lightwave Technology, 33(20), pp. 4240-4252.
E. Li, Q. Gao, R. T. Chen, and A. X. Wang, "Ultracompact Silicon-Conductive Oxide Nanocavity Modulator with 0.02 Lambda-Cubic Active Volume," Nano Lett. 18, (2018).
S. Campione, M. G. Wood, D. K. Serkland, S. Parameswaran, J. Ihlefeld, T. S. Luk, J. R. Wendt, K. M. Geib, and G. A. Keeler, "Submicrometer Epsilon-Near-Zero Electroabsorption Modulators Enabled by High-Mobility Cadmium Oxide," IEEE Photonics J. 9, 1-7 (2017).
D. Liang, G. Kurczveil, M. Fiorentino, S. Srinivasan, J. E. Bowers, and R. G. Beausoleil, "A Tunable Hybrid III-V-on-Si MOS Microring Resonator with Negligible Tuning Power Consumption," in Optical Fiber Communication Conference (OSA, 2016), p. Th1K.4.
Wang, X., Liu, J., Yan, Q., Chen, S. and Yu, J., 2003. SOI thermo-optic modulator with fast response. Chinese Optics Letters, 1(9), pp. 527-528.
Wang, X., Lin, C.Y., Chakravarty, S., Luo, J., Jen, A.K.Y. and Chen, R.T., 2011. Effective in-device r 33 of 735 pm/V on electro-optic polymer infiltrated silicon photonic crystal slot waveguides. Optics letters, 36(6), pp. 882-884.
Lai, W.C., Chakravarty, S., Wang, X., Lin, C. and Chen, R.T., 2011. Photonic crystal slot waveguide absorption spectrometer for on-chip near-infrared spectroscopy of xylene in water. Applied Physics Letters, 98(2), p. 7.
Lai, W.C., Chakravarty, S., Wang, X., Lin, C. and Chen, R.T., 2011. On-chip methane sensing by near-IR absorption signatures in a photonic crystal slot waveguide. Optics letters, 36(6), pp. 984-986.
Lin, C.Y., Wang, X., Chakravarty, S., Lee, B.S., Lai, W.C. and Chen, R.T., 2010. Wideband group velocity independent coupling into slow light silicon photonic crystal waveguide. Applied Physics Letters, 97(18), p. 233.
Ren, F., Li, M., Gao, Q., Cowell III, W., Luo, J., Jen, A.K. and Wang, A.X., 2015. Surface-normal plasmonic modulator using sub-wavelength metal grating on electro-optic polymer thin film. Optics Communications, 352, pp. 116-120.
Wang, L., Wang, X., Jiang, W., Choi, J., Bi, H. and Chen, R., 2005. 45 polymer-based total internal reflection coupling mirrors for fully embedded intraboard guided wave optical interconnects. Applied Physics Letters, 87(14), p. 141110.
Dou, X., Wang, X., Huang, H., Lin, X., Ding, D., Pan, D.Z. and Chen, R.T., 2010. Polymeric waveguides with embedded micromirrors formed by Metallic Hard Mold. Optics express, 18(1), pp. 378-385.
Wang, X., Jiang, W., Wang, L., Bi, H. and Chen, R.T., 2008. Fully embedded board-level optical interconnects from waveguide fabrication to device integration. Journal of Lightwave Technology, 26(2), pp. 243-250.
Li, E., Gao, Q., Liverman, S. and Wang, A.X., 2018. One-volt silicon photonic crystal nanocavity modulator with indium oxide gate. Optics letters, 43(18), pp. 4429-4432.
E. Li, B. Ashrafi Nia, B. Zhou, A. X. Wang, "Transparent Conductive Oxide-Gated Silicon Microring with Extreme Resonance Wavelength Tunability," Photonics Research, Jan. 2019.
Gao, Q., Li, E. and Wang, A.X., 2018. Ultra-compact and broadband electro-absorption modulator using an epsilon-near-zero conductive oxide. Photonics Research, 6(4), pp. 277-281.

(56) References Cited

OTHER PUBLICATIONS

Gao, Q., Li, E. and Wang, A.X., 2018. Comparative analysis of transparent conductive oxide electro-absorption modulators. Optical Materials Express, 8(9), pp. 2850-2862.
Hänsch W, Vogelsang T, Kircher R and Orlowski M 1989 Carrier transport near the Si/SiO2 interface of a MOSFET Solid-State Electronics 32(10) 839-49.
Wettstein A, Schenk A and Fichtner W 2001 Quantum device-simulation with the density-gradient model on unstructured grids IEEE Transactions On Electron Devices 48(2) 279-84.
Bock, P.J., Cheben, P., Schmid, J.H., Lapointe, J., Delâge, A., Janz, S., Aers, G.C., Xu, D.X., Densmore, A. and Hall, T.J., 2010. Subwavelength grating periodic structures in silicon-on-insulator: a new type of microphotonic waveguide. Optics express, 18(19), pp. 20251-20262.chong.
Donzella, V., Sherwali, A., Flueckiger, J., Grist, S.M., Fard, S.T. and Chrostowski, L., 2015. Design and fabrication of SOI micro-ring resonators based on sub-wavelength grating waveguides. Optics express, 23(4), pp. 4791-4803.
Wang, Z., Xu, X., Fan, D., Wang, Y. and Chen, R.T., 2016. High quality factor subwavelength grating waveguide micro-ring resonator based on trapezoidal silicon pillars. Optics letters, 41(14), pp. 3375-3378.
Yan, H., Huang, L., Xu, X., Chakravarty, S., Tang, N., Tian, H. and Chen, R.T., 2016. Unique surface sensing property and enhanced sensitivity in microring resonator biosensors based on subwavelength grating waveguides. Optics express, 24(26), pp. 29724-29733.
Pan, Z., Xu, X., Chung, C.J., Dalir, H., Yan, H., Chen, K., Wang, Y., Jia, B. and Chen, R.T., 2018. High Speed Modulator Based on Electro Optic Polymer Infiltrated Subwavelength Grating Waveguide Ring Resonator. Laser & Photonics Reviews, 12(6), p. 1700300.
Choi, C.H., David, M., Gao, Z., Chang, A., Allen, M., Wang, H. and Chang, C.H., 2016. Large-scale generation of patterned bubble arrays on printed bi-functional boiling surfaces. Scientific reports, 6, p. 23760.
MacNeill, W., Choi, C.H., Chang, C.H. and Malhotra, R., 2015. On the self-damping nature of densification in photonic sintering of nanoparticles. Scientific reports, 5, p. 14845.
Choi, C.H., Levin, J.B. and Chang, C.H., 2016. Continuous formation of a seed layer and vertical ZnO nanowire arrays enabled by tailored reaction kinetics in a microreactor. CrystEngComm, 18(44), pp. 8645-8652.
Li, E., Chong, X., Ren, F. and Wang, A.X., 2016. Broadband on-chip near-infrared spectroscopy based on a plasmonic grating filter array. Optics letters, 41(9), pp. 1913-1916.
Albuquerque, G.H. and Herman, G.S., 2016. Chemically modulated microwave-assisted synthesis of MOF-74 (Ni) and preparation of metal-organic framework-matrix based membranes for removal of metal ions from aqueous media. Crystal Growth & Design, 17(1), pp. 156-162.
Gao, Q., Ren, F. and Wang, A.X., 2016. Direct and efficient optical coupling into plasmonic integrated circuits from optical fibers. IEEE Photon. Technol. Lett., 28(11), pp. 1165-1168.
Bansal, S. and Malhotra, R., 2016. Nanoscale-shape-mediated coupling between temperature and densification in intense pulsed light sintering. Nanotechnology, 27(49), p. 495602.
Chong, X., Kim, K.J., Li, E., Zhang, Y., Ohodnicki, P.R., Chang, C.H. and Wang, A.X., 2016. Near-infrared absorption gas sensing with metal-organic framework on optical fibers. Sensors and Actuators B: Chemical, 232, pp. 43-51.
Chong, X., Li, E., Squire, K. and Wang, A.X., 2016. On-chip near-infrared spectroscopy of CO2 using high resolution plasmonic filter array. Applied Physics Letters, 108(22), p. 221106.
Choi, C.H., Allan-Cole, E. and Chang, C.H., 2017. Visible to infrared plasmonic absorption from silver nanostructures enabled by microreactor-assisted solution deposition. CrystEngComm, 19(9), pp. 1265-1272.
He, Y., Kim, K.J. and Chang, C.H., 2017. Continuous, size and shape-control synthesis of hollow silica nanoparticles enabled by a microreactor-assisted rapid mixing process. Nanotechnology, 28(23), p. 235602.
Kim, K.J., Pan, C., Bansal, S., Malhotra, R., Kim, D.H. and Chang, C.H., 2017. Scalably synthesized environmentally benign, aqueous-based binary nanoparticle inks for Cu 2 ZnSn (S, Se) 4 photovoltaic cells achieving over 9% efficiency. Sustainable Energy & Fuels, 1(2), pp. 267-274.
Dexter, M., Gao, Z., Bansal, S., Chang, C.H. and Malhotra, R., 2018. Temperature, Crystalline Phase and Influence of Substrate Properties in Intense Pulsed Light Sintering of Copper Sulfide Nanoparticle Thin Films. Scientific reports, 8(1), p. 2201.
Gao, Q., Liverman, S. and Wang, A.X., 2017. Design and characterization of high efficiency nanoantenna couplers with plasmonic integrated circuit. Journal of Lightwave Technology, 35(15), pp. 3182-3188.
Chong, X., Kim, K.J., Zhang, Y., Li, E., Ohodnicki, P.R., Chang, C.H. and Wang, A.X., 2017. Plasmonic nanopatch array with integrated metal—organic framework for enhanced infrared absorption gas sensing. Nanotechnology, 28(26), p. 26LT01.
Chong, X., Zhang, Y., Li, E., Kim, K.J., Ohodnicki, P.R., Chang, C.H. and Wang, A.X., 2018. Surface-Enhanced Infrared Absorption: Pushing the Frontier for On-Chip Gas Sensing. ACS sensors, 3(1), pp. 230-238.
Choi, C.H., Krishnan, S., TeGrotenhuis, W. and Chang, C.H., 2018. Capillary Rise of Nanostructured Microwicks. Micromachines, 9(4), p. 153.
Chiu, D., He, Y., Gao, Z., Remple, C. and Chang, C.H., 2018. Growth Kinetics of ZnS Thin Films from a High-Rate Chemical Bath Deposition with Trisodium-Nitrilotriacetate Complexing. ECS Journal of Solid State Science and Technology, 7(11), pp. P615-P623.
Albuquerque, G.H., Squire, K., Wang, A.X. and Herman, G.S., 2017. Continuous Synthesis of Monodisperse Ag Nanocubes. Crystal Growth & Design, 18(1), pp. 119-125.
Hwang, H.J., Devaraj, H., Yang, C., Gao, Z., Chang, C.H., Lee, H. and Malhotra, R., 2018. Rapid Pulsed Light Sintering of Silver Nanowires on Woven Polyester for personal thermal management with enhanced performance, durability and cost-effectiveness. Scientific reports, 8(1), p. 17159.
Kim, K.J., Zhang, Y., Kreider, P.B., Chong, X., Wang, A.X., Ohodnicki Jr, P.R., Baltrus, J.P. and Chang, C.H., 2018. Nucleation and growth of oriented metal-organic framework thin films on thermal SiO2 surface. Thin Solid Films, 659, pp. 24-35.
Dexter, M., Pfau, A., Gao, Z., Herman, G.S., Chang, C.H. and Malhotra, R., 2018. Modeling nanoscale temperature gradients and conductivity evolution in pulsed light sintering of silver nanowire networks. Nanotechnology, 29(50), p. 505205.
Nguyen-Huu, D. and Nguyen, T., 2017. Probabilistic Models and Algorithms for Data Synchronization/Broadcast Via Network Coding. IEEE Transactions on Vehicular Technology, 66(7), pp. 6075-6088.
Nguyen-Huu, D., Duong, T. and Nguyen, T., 2017. Location-assisted coding for FSO communication. IEEE Transactions on Communications, 65(10), pp. 4360-4370.
Liverman, S., Wang, Q., Chu, Y.J., Borah, A., Wang, S., Natarajan, A., Wang, A.X. and Nguyen, T., 2018. WiFO: A hybrid communication network based on integrated free-space optical and WiFi femtocells. Computer Communications, 132, pp. 74-83.
Liverman, S., Wang, Q., Chu, Y., Duong, T., Nguyen-Huu, D., Wang, S., Nguyen, T. and Wang, A.X., 2016, February. Integrating free-space optical communication links with existing WiFi (WiFO) network. In Broadband Access Communication Technologies X (vol. 9772, p. 97720P). International Society for Optics and Photonics.
Liverman, S.T., Wang, Q., Chu, Y.J., Natarajan, A., Nguyen, T. and Wang, A.X., Oct. 2016. Hybrid wireless communication networks: Integrating free-space optics and wifi. In Frontiers in Optics (pp. JTh2A-56). Optical Society of America.
Nguyen, T. and Nguyen, T., Sep. 2017. Embedded Coding Techniques for FSO Communication. In 2017 IEEE 86th Vehicular Technology Conference (VTC-Fall) (pp. 1-5). IEEE.

(56) References Cited

OTHER PUBLICATIONS

Duong, T., Nguyen-Huu, D. and Nguyen, T., Nov. 2015. Location assisted coding (lac): Embracing interference in free space optical communications. In Proceedings of the 11th ACM Symposium on QoS and Security for Wireless and Mobile Networks (pp. 107-114). ACM.
Chu, Y.J., Nguyen, T. and Stark, Z.N., Aug. 2016. Wifo: Hybrid wifi and free-space optical communication system with pam optimal decoding. In 2016 25th International Conference on Computer Communication and Networks (ICCCN) (pp. 1-6). IEEE.
Wang, Q., Liverman, S., Chu, Y.J., Borah, A., Wang, S., Nguyen, T., Natarajan, A. and Wang, A.X., Nov. 2017. WiFO: A Hybrid WiFi Free-Space Optical Communication Networks of Femtocells. In Proceedings of the 20th ACM International Conference on Modelling, Analysis and Simulation of Wireless and Mobile Systems (pp. 35-42). ACM.
Zhang, Y., Chu, Y.J. and Nguyen, T., Jul. 2017. Coverage Algorithms for WiFO: A Hybrid FSO-WiFi Femtocell Communication System. In 2017 26th International Conference on Computer Communication and Networks (ICCCN) (pp. 1-6). IEEE.
Liverman, S., Wang, Q., Chu, Y.C., Borah, A., Wang, S., Natarajan, A., Nguyen, T. and Wang, A.X., Jan. 2018. Indoor communications networks realized through hybrid free-space optical and wifi links. In Broadband Access Communication Technologies XII (vol. 10559, p. 105590H). International Society for Optics and Photonics.
Kong, X., Chong, X., Squire, K. and Wang, A.X., 2018. Microfluidic diatomite analytical devices for illicit drug sensing with ppb-level sensitivity. Sensors and Actuators B: Chemical, 259, pp. 587-595.
Squire, K., Kong, X., LeDuff, P., Rorrer, G.L. and Wang, A.X., 2018. Photonic crystal enhanced fluorescence immunoassay on diatom biosilica. Journal of biophotonics, 11(10), p.e201800009.
Koeber, S., Palmer, R., Lauermann, M., Heni, W., Elder, D.L., Korn, D., Woessner, M., Alloatti, L., Koenig, S., Schindler, P.C. and Yu, H., 2015. Femtojoule electro-optic modulation using a silicon-organic hybrid device. Light: Science & Applications, 4(2), p.e255.
Miller, D.A. J. ; Attojoule Optoelectronics for Low-Energy Information Processing and Communications; Lightwave Technol. 2017, 35, 346-396.
Pan, Z.; Zhang, C.; Subbaraman, H.; Chung, C. J.; Li, Q.; Xu, X.; Zhang, X.; Guo, L.J.; Chen, R.T.; High speed attojoule/bit passive and active nanophotonic devices for computing and optical interconnects (Conference Presentation); In SPIE OPTO, Feb. 2017; International Society for Optics and Photonics.
Asghari, M.; Krishnamoorthy, A. V.; Energy-efficient communication; Nat. Photonics 2011, 5, 268-270.
Rumley, S.; Nikolova, D.; Hendry, R.; Li, Q.; Calhoun, D.; Silicon Photonics for Exascale Systems; Bergman, K. J. Lightwave Technol. 2015, 33, 547-562.
Timurdogan, E.; Sorace-Agaskar, C. M.; Sun, J.; Hosseini, E. S.; Biberman, A.; Watts, M. R. ; An ultralow power athermal silicon modulator; Nat. Commun. 2014, 5.
Leuthold, J.; Koos, C.; Freude, W. ; Nonlinear silicon photonics; Nat. Photonics 2010, 4, 535-544.
Tian, Y.; Zhang, L.; Ji, R.; Yang, L.; Zhou, P.; Chen, H.; Ding, J.; Zhu, W.; Lu, Y.; Jia, L.; Fang, Q.; Proof of concept of directed OR/NOR and AND/NAND logic circuit consisting of two parallel microring resonators; Opt. Lett. 2011, 36, 1650-1652.
Xu, Q.; Soref, R.; Reconfigurable optical directed-logic circuits using microresonator-based optical switches; Opt. Express 2011, 19, 5244-5259.
Wang, Z.; Ying, Z.; Dhar, S.; Zhao, Z.; Pan, D. Z.; Chen, R. T.; On-chip Microring Resonator Based Electro-optic Full Adder for Optical Computing; In CLEO: Science and Innovations, May 2017; Optical Society of America.
Barnes, W. L.; Dereux, A.; Ebbesen, T. W. ; Surface plasmon subwavelength optics; Nature 2003, 424, 824.
Melikyan, A.; Alloatti, L.; Muslija, A.; Hillerkuss, D.; Schindler, P. C.; Li, J.; Palmer, R.; Korn, D.; Muehlbrandt, S.; Van Thourhout, D.; Chen, B.; High-speed plasmonic phase modulators; Nat. Photonics 2014, 8, 229-233.

Haffner, C.; Heni, W; Fedoryshyn, Y.; Niegemann, J.; Melikyan, A.; Elder, D. L.; Baeuerle, B.; Salamin, Y.; Josten, A.; Koch, U.; Hoessbacher, C.; All-plasmonic Mach-Zehnder modulator enabling optical high-speed communication at the microscale; Nat. Photonics 2015, 9, 525-528.
Watts, M. R.; Zortman, W. A.; Trotter, D. C.; Young, R. W.; Lentine, A. L.; Vertical junction silicon microdisk modulators and switches; Opt. Express 2011, 19, 21989-22003.
Tanabe, T.; Nishiguchi, K.; Kuramochi, E.; Notomi, M.; Low power and fast electro-optic silicon modulator with lateral p-i-n embedded photonic crystal nanocavity; Opt. Express 2009, 17, 22505-22513.
Soref, R. A.; Bennett, B. R.; Electrooptical Effects in Silicon; IEEE J. Quantum Elect. 1987, 23, 123-129.
Ding, J.; Chen, H.; Yang, L.; Zhang, L.; Ji, R.; Tian, Y.; Zhu, W.; Lu, Y.; Zhou, P.; Min, R.; Yu, M.; Ultra-low-power carrier-depletion Mach-Zehnder silicon optical modulator; Opt. Express 2012, 20, 7081-7087.
Xu, Q.; Schmidt, B.; Pradhan, S.; Lipson, M.; Micrometre-scale silicon electro-optic modulator; Nature 2005, 435, 325.
Xiao, X.; Li, X.; Xu, H.; Hu, Y.; Xiong, K.; Li, Z.; Chu, T.; Yu, J.; Yu, Y.; 44-Gb/s Silicon Microring Modulators Based on Zigzag PN Junctions; IEEE Photonic. Tech. L. 2012, 24, 1712-1714.
Reed, G. T.; Mashanovich, G.; Gardes, F. Y.; Thomson, D. J.; Silicon optical modulators; Nat. Photonics 2010, 4, 518-526.
DeRose, C. T.; Watts, M. R.; Trotter, D. C.; Luck, D. L.; Nielson, G. N.; Young, R. W. ; Silicon Microring Modulator with Integrated Heater and Temperature Sensor for Thermal Control; In Conference on Lasers and Electro-optics, May 2010; Optical Society of America.
Liu, M.; Yin, X.; Ulin-Avila, E.; Geng, B.; Zentgraf, T.; Ju, L.; Wang, F.; Zhang, X. ; A graphene-based broadband optical modulator; Nature 2011, 474, 64.
Youngblood, N.; Anugrah, Y.; Ma, R.; Koester, S. J.; Li, M.; Multifunctional Graphene Optical Modulator and Photodetector Integrated on Silicon Waveguides Nano Lett. 2014, 14, 2741-2746.
Briggs, R. M.; Pryce, I. M.; Atwater, H. A.; Compact silicon photonic waveguide modulator based on the vanadium dioxide metal-insulator phase transition; Opt. Express 2010, 18, 11192-11201.
Xiong, C.; Pernice, W. H.; Ngai, J. H.; Reiner, J. W; Kumah, D.; Walker, F. J.; Ahn, C. H.; Tang, H. X.; Active Silicon Integrated Nanophotonics: Ferroelectric BaTiO3 Devices; Nano Lett. 2014, 14, 1419-1425.
Naik, G. V.; Kim, J.; Boltasseva, A.; Oxides and nitrides as alternative plasmonic materials in the optical range [Invited]; Opt. Mater. Express 2011, 1, 1090-1099.
Naik, G. V.; Shalaev, V. M.; Boltasseva, A.; Alternative Plasmonic Materials: Beyond Gold and Silver; Adv. Mater. 2013, 25, 3264-3294.
Ma, Z.; Li, Z.; Liu, K.; Ye, C.; Sorger, V. J.; Indium-Tin-Oxide for High-performance Electro-optic Modulation; Nanophotonics 2015, 4, 198-213.
Keeler, G. A.; Geib, K. M.; Serkland, D. K.; Parameswaran, S.; Luk, T. S.; Grine, A. J.; Ihlefeld, J.; Campione, S.; Wendt, J. R.; Multi-Gigabit Operation of a Compact, Broadband Modulator Based on ENZ Confinement in Indium Oxide; In Optical Fiber Communication Conference, Mar. 2017; Optical Society of America.
Sorger, V. J.; Lanzillotti-Kimura, N. D.; Ma, R. M.; Zhang, X.;Ultra-compact silicon nanophotonic modulator with broadband response; Nanophotonics 2012, 1, 17-22.
Lee, H. W; Papadakis, G.; Burgos, S. P.; Chander, K.; Kriesch, A.; Pala, R. A.; Peschel, U.; Atwater, H. A.;Nanoscale Conducting Oxide PlasMOStor; Nano letters 2014, 14, 6463-6468.
Chiang, H. Q.; Wager, J. F.; Hoffman, R. L.; Jeong, J.; Keszler, D. A.; High mobility transparent thin-film transistors with amorphous zinc tin oxide channel layer; Appl. Phys. Lett. 2005, 86, 013503.
Feigenbaum, E.; Diest, K.; Atwater, H. A.; Unity-Order Index Change in Transparent Conducting Oxides at Visible Frequencies; Nano Lett. 2010, 10, 2111-2116.
Vasudev, A. P.; Kang, J. H.; Park, J.; Liu, X.; Brongersma, M. L. ; Electro-optical modulation of a silicon waveguide with an "epsilon-near-zero" material; Opt. Express 2013, 21, 26387-26397.

(56) References Cited

OTHER PUBLICATIONS

Park, J.; Kang, J. H.; Liu, X.; Brongersma, M. L.; Electrically Tunable Epsilon-Near-Zero (ENZ) Metafilm Absorbers; Sci. Rep. 2015, 5, srep15754.

Liberal, I.; Engheta,; Near-zero refractive index photonics; N. Nat. Photonics 2017, 11, 149-158.

Melikyan, A.; Lindenmann, N.; Walheim, S.; Leufke, P. M.; Ulrich, S.; Ye, J.; Vincze, P.; Hahn, H.; Schimmel, T.; Koos, C.; Freude,; Surface plasmon polariton absorption modulator; W. Opt. Express 2011, 19, 8855-8869.

Krasavin, A. V.; Zayats, A. V.; Photonic Signal Processing on Electronic Scales: Electro-Optical Field-Effect Nanoplasmonic Modulator; Phys. Rev. Lett. 2012, 109, 053901.

Colinge, J. P.; Colinge, C. A. ; Energy Band Theory; Physics of semiconductor devices; Springer Science & Business Media, 2005.

Meng, B.; Booske, J.; Cooper, R.; Extended Cavity Perturbation Technique to Determine the Complex Permittivity of Dielectric Materials; IEEE T. Microw. Theory 1995, 43, 2633-2636.

Shi, K.; Lu, Z. ; Field-effect opticalmodulationbasedonepsilon-near-zeroconductive oxide; Opt. Commun. 2016, 370, 22-28.

Zain, A. R. M.; Johnson, N. P.; Sorel, M.; Richard, M.; Ultra high quality factor one dimensional photonic crystal/photonic wire microcavities in silicon-on-insulator (SOI); Opt. Express 2008, 16, 12084-12089.

Sze, S. M.; Ng, K. K. ; Silicon MOS Capacitor; Physics of semiconductor devices; John wiley & sons, 2006.

Yota, J.; Shen, H.; Ramanathan, R. J. ; Characterization of atomic layer deposition HfO2, Al2O3, and plasma-enhanced chemical vapor deposition Si3N4 as metal-insulator-metal capacitor dielectric for GaAs HBT technology; Vac. Sci. Technol. A. 2013, 31, 01A134.

Schmidt, B.; Xu, Q.; Shakya, J.; Manipatruni, S.; Lipson, M.; Compact electro-optic modulator on silicon-oninsulator substrates using cavities with ultrasmall modal volumes; Optics Express 2007, 15, 3140-3148.

Tanabe, T.; Nishiguchi, K.; Kuramochi, E.; Notomi, M.; Low power and fast electro-optic silicon modulator with lateral o-i-n embedded photonic crystal nanocavity; Opt. Express 2009, 17, 22505-22513.

Ding, J.; Chen, H.; Yang, L.; Zhang, L.; Ji, R.; Tian, Y.; Zhu, W.; Lu, Y.; Zhou, P.; Min, R.; Yu, M.; Opt. Express 2012, 20, 7081-7087.

\* cited by examiner

PIN CARRIER INJECTION

REVERSED PN JUNCTION

MOS CAPACITOR STRUCTURE

HYBRID SILICON-TRANSPARENT CONDUCTIVE OXIDE DEVICES

RELATED APPLICATIONS

This application claims the benefit of priority of U.S. Provisional Application No. 62/933,543, filed on Nov. 11, 2019, the entire contents of which application(s) are incorporated herein by reference.

GOVERNMENT LICENSE RIGHTS

This invention was made with government support under Award No. 1927271 from the National Science Foundation. The government has certain rights in the invention.

FIELD OF THE INVENTION

The present invention relates generally to hybrid silicon-transparent conductive oxide (Si-TCO) devices and more particularly but not exclusively to micro-ring resonators and micro-disks for large-scale on-chip wavelength division multiplexing optical interconnects.

BACKGROUND OF THE INVENTION

The present inventors believe that large-scale to extreme-scale parallel optical interconnects hold the key to resolve the grand challenge of bandwidth demand between on-chip cores and within multi-chip modules in the decades to come, and that silicon photonics, which is the mostly available integrated photonic platform, must excel in energy efficiency and bandwidth density in order to meet the stringent requirements of extreme-scale photonic interconnects. Unfortunately, silicon lacks a meaningful Pockel effect due to its symmetric crystalline structure, and the free-carrier-induced plasma dispersion effect is also limited. The footprint, driving voltage, energy efficiency, and bandwidth density of active silicon photonic devices, including electro-optic (E-O) modulators, tunable wavelength filters, optical switches and optical phased arrays, have reached a bottleneck after more than two decades of extensive research. Further improvement is believed by the present inventors to require heterogeneous integration with new functional materials, such as III-V compound semiconductors, 2-D materials like graphene, E-O polymers, ferroelectric materials, and phase change materials. However, integration of these emerging materials usually raises concerns with fabrication process compatibility, material stability, and disruption to silicon photonics design, which pose grand challenges for large-scale device integration. Accordingly, there is a need for integrated photonic devices that can provide platform that has an improved footprint, driving voltage, energy efficiency, and/or bandwidth density.

SUMMARY OF THE INVENTION

In one of its aspects the present invention may provide hybrid silicon-transparent conductive oxide (Si-TCO) devices, especially micro-ring resonators including micro-disks, with unprecedented E-O tunability and energy efficiency for large-scale on-chip wavelength division multiplexing (WDM) optical interconnects. In this respect, the present invention may relate not only to the development of highly efficient metal-oxide-semiconductor (MOS) capacitor-driven active Si-TCO photonic devices, but also to scalable integration with silicon photonics processes for future scalable manufacturing using commercial silicon photonics foundry. TCO materials of the present invention may include extraordinary perturbation to the refractive indices, achieved either through oxygen vacancy doping or electrical gating. Importantly, TCO materials can be deposited with reliable and repeatable quality using cost-effective DC- or RF-sputtering on various platforms. In addition, TCO materials used in the present invention may possess excellent long-term stability and can survive post-processing temperature of silicon CMOS processes. Therefore, TCO materials of the present invention may be fully compatible with silicon photonics and have the potential to be readily integrated with existing silicon photonic integrated circuits (PICs). By way of example, TCO materials of the present invention may be one or more of $In_2O_3$, ITO, $Ti:In_2O_3$, $Mo:In_2O_3$, CdO, IGZO, and AZO.

In another of its aspects, the present invention may provide electrically tunable micro-ring/micro-disk resonators driven by $TCO/HfO_2/p$-Si capacitors for on-chip WDM with near-zero power dissipation, which can replace the power-hungry thermal heaters used for Si PICs. As such, multi-channel on-chip WDM transmitter using dual-functional micro-ring resonators in accordance with the present invention may demonstrate the desired features of 25 Gb/s/channel bandwidth, high energy efficiency to 1 fJ/bit with extremely small footprint.

Among its other aspects, the present invention may include providing devices (and fundamental investigation of device physics) such as hybrid Si-TCO micro-ring resonators that achieve: extremely large E-O tuning efficiency (~1,000 pm/V) to eliminate thermal heaters, and optimized balance between energy efficiency and bandwidth for on-chip optical interconnects; a dual-functional micro-ring resonator capable of 25 Gb/s E-O modulation with 1 fJ/bit energy efficiency, and near-zero static power dissipation to lock-in the operational wavelength over 40K temperature variation; and/or a multi-channel MUX/DeMUX WDM transmitter using dual-functional micro-ring resonators to demonstrate large-scale on-chip optical interconnect feasibility. Devices of the present invention may further transcend existing silicon micro-ring resonators to an unprecedented level of temperature tolerance, E-O tunability, energy efficiency and bandwidth density.

Accordingly, in one of its aspects the present invention may provide an electrically tunable silicon-transparent conductive oxide device, comprising a resonator structured as a micro-ring or a micro-disk; the resonator may have both a wavelength tuning electrode and a high-speed E-O modulation electrode operably coupled thereto. The device may include a voltage source electrically coupled to the wavelength tuning electrode and configured to provide a DC bias or slow varying control signal thereto. A driving circuit may be electrically coupled to the high-speed E-O modulation electrode and may be configured to provide a driving signal to the high-speed E-O modulation electrode. The driving circuit may include a function generator or a CMOS driver. in addition, a MOS-type capacitor may be operably connected to the resonator at a location to electrically drive the resonator. The MOS-type capacitor may be provided as a $TCO/HfO_2/p$-Si capacitor, and the TCO may be one or more of $In_2O_3$, ITO, $Ti:In_2O_3$, $Mo:In_2O_3$, CdO, IGZO, and AZO. Exemplary devices of the present invention may have an E-O tuning efficiency of the resonator is at least 1,000 pm/V, an E-O modulation speed of at least 25 Gb/s, and 1 fJ/bit energy efficiency.

In a further of its aspects the present invention may provide a multi-channel wavelength division multiplexer comprising a silicon bus waveguide optically coupled to a plurality of the devices of the preceding paragraph. The multi-channel wavelength division multiplexer may include a plurality of optical input channels optically coupled to an input of the wavelength division multiplexer, each optical input channel having a selected optical wavelength associated therewith. Each one of the resonators may be operably connected to a respective driving circuit, and each respective driving circuit tuned to a respective one of the selected optical wavelengths of the optical input channels. The wavelength division multiplexer may be provided on a single chip.

BRIEF DESCRIPTION OF THE DRAWINGS

The foregoing summary and the following detailed description of exemplary embodiments of the present invention may be further understood when read in conjunction with the appended drawings, in which.

DETAILED DESCRIPTION OF THE INVENTION

Figure 1A:
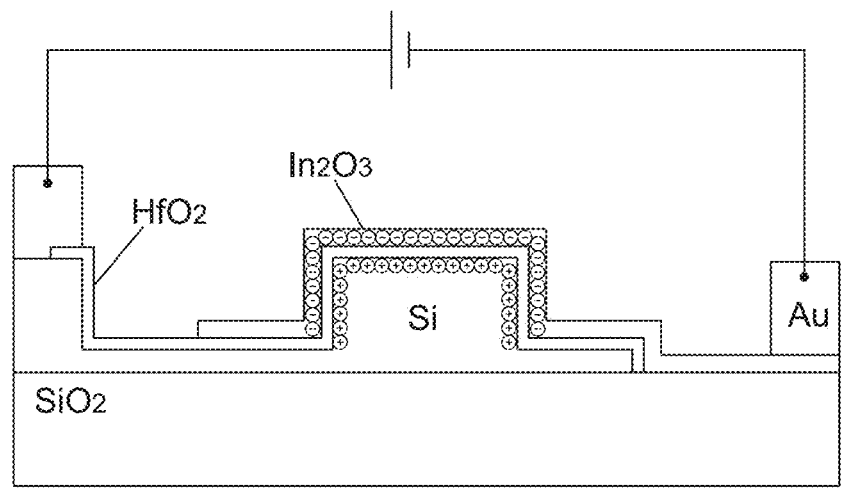
FIG. 1A schematically illustrates an active MOS structure of a device of the present invention comprising $In_2O_3/HfO_2/$p-Si for ultra-efficient E-O modulation.
Figure 1B:
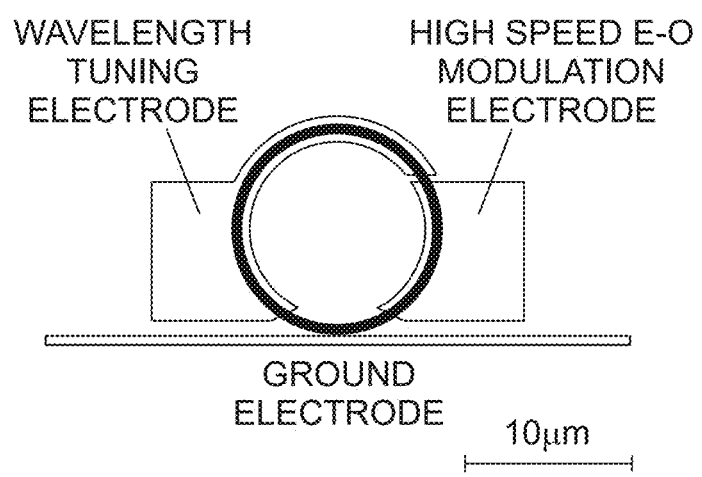
FIG. 1B schematically illustrates an exemplary configuration of a dual functional micro-ring resonator in accordance with the present invention with a wavelength tuning electrode and a high-speed E-O modulation electrode.
Figure 1C:
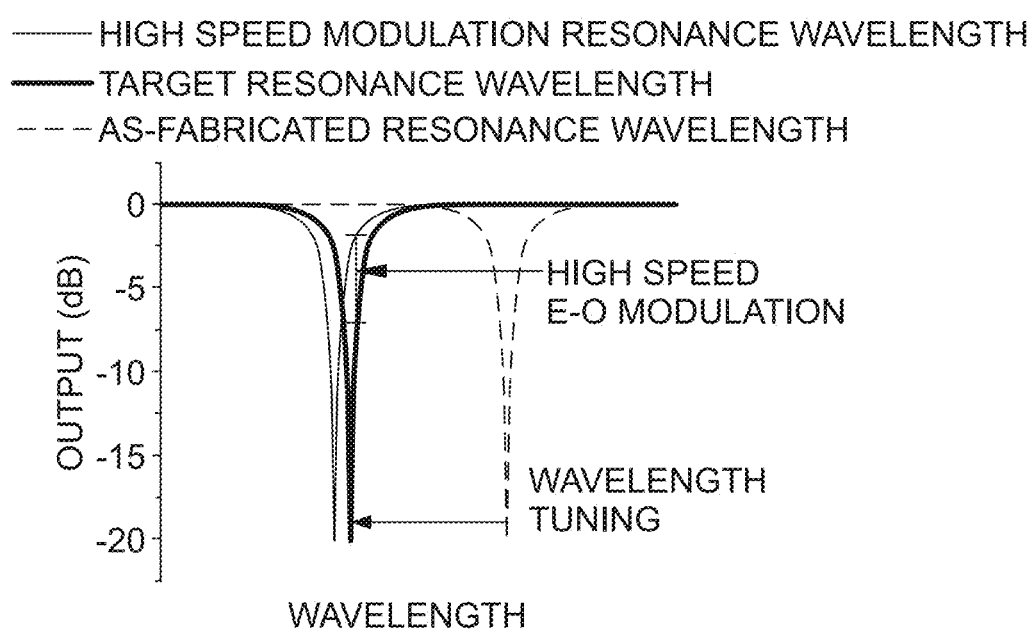
FIG. 1C schematically illustrates large range resonance wavelength tuning to compensate potential fabrication errors and temperature variation, and shows highspeed E-O modulation.
Figure 1D:
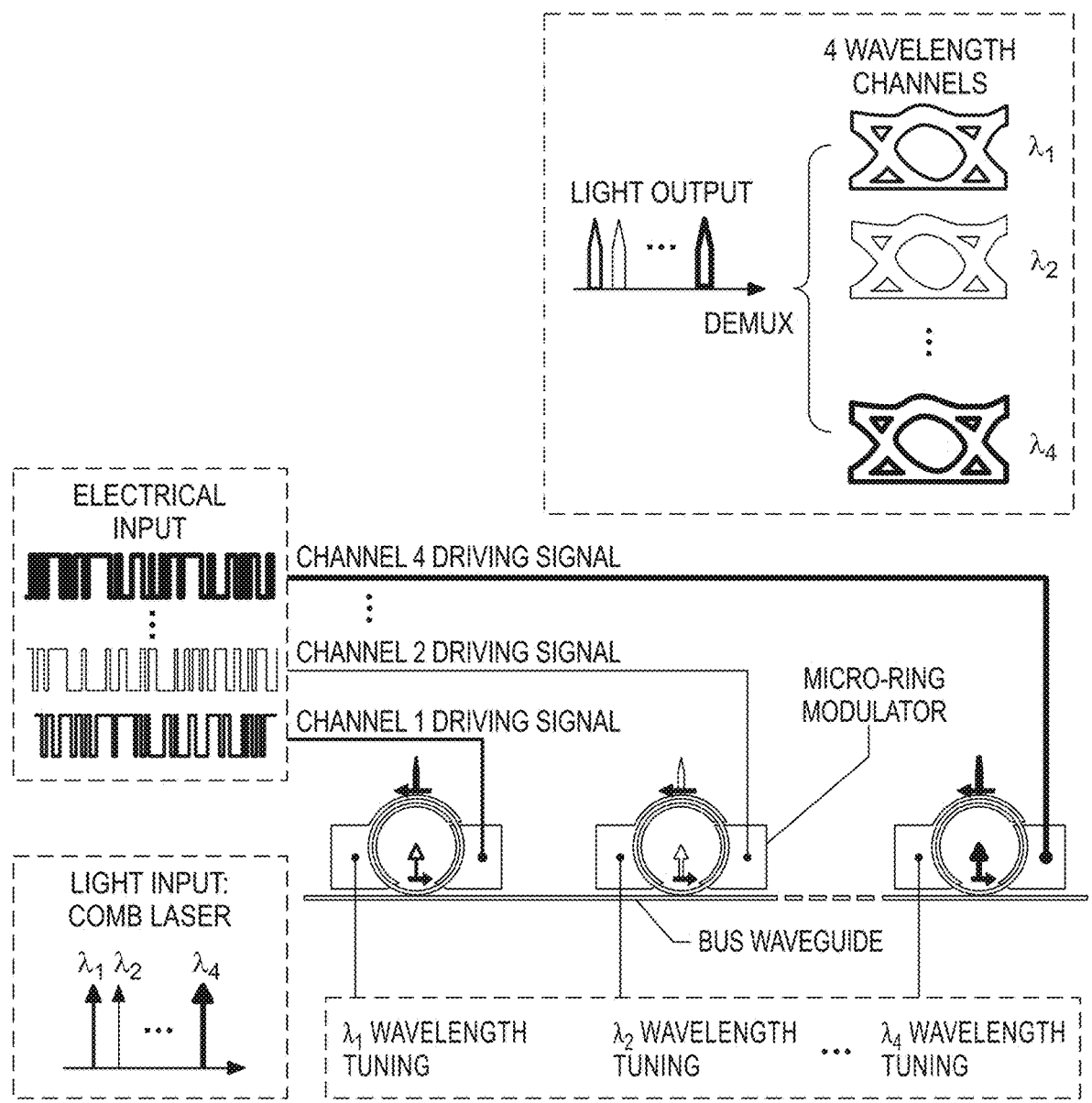
FIG. 1D schematically illustrates an exemplary configuration of a 4-channel on-chip WDM transmitter in accordance with the present invention that can perform E-O modulation and wavelength MUX/DeMUX independently.

FIGS. 1A-1D schematically illustrate an exemplary configuration of a hybrid Si-TCO photonic device in accordance with the present invention. FIG. 1A shows a MOS-type capacitor including $In_2O_3/HfO_2/$p-Si as the active device for ultra-efficient E-O modulation. (As used herein, the term "MOS-type capacitor" is defined to mean a capacitor having a structure similar to that of a MOS capacitor, but without the metal layer, so "MOS-type capacitors" of the present invention are metal-free in the sense that the metal of the MOS capacitor is replaced by a semiconductor, such as a metal oxide, e.g., a TCO such as $In_2O_3$, ITO, $Ti:In_2O_3$, $Mo:In_2O_3$, CdO, IGZO, and/or AZO, for example.) The MOS-type capacitor relies on the gate-voltage-induced free carrier accumulation, i.e., electrons in the $In_2O_3$ layer and holes in the p-type silicon layer, to modulate the effective index of the Si-TCO waveguide. In this configuration, a large E-O modulation effect may be achieved due to the strong plasma-dispersion effect of TCO film and the large capacitance density of the MOS structure. FIG. 1B shows a schematic of an exemplary dual-functional micro-ring resonator in accordance with the present invention, which has a wavelength tuning electrode driven by a DC bias or slow varying control signals and a high-speed E-O modulation electrode driven by a function generator or a CMOS driver. As illustrated in FIG. 1C, the dual-functional micro-ring resonator can adjust its own working wavelength over a large range through the gate voltage applied to the wavelength tuning electrode to compensate fabrication errors and temperature variation. In addition, it is capable of conducting high-speed E-O conversion from the highspeed E-O modulation electrode by modulating the peak transmission. FIG. 1D represents an on-chip transmitter having a silicon bus waveguide coupled to multiple dual-functional micro-ring resonators in accordance with the present invention. Four constant-wave (CW) lasers with wavelength of $\lambda_1$ to $\lambda_N$ (N=4 in the figure) are coupled into the bus waveguide and each micro-ring resonator can perform E-O modulation and wavelength multiplexing/de-multiplexing (MUX/DeMUX) independently. In addition, the micro-ring resonators can dynamically compensate temperature fluctuation and fabrication variation with near-zero static power consumption, which can eliminate power-hungry thermal heaters that have been widely used in silicon PICs.

Figure 2A:
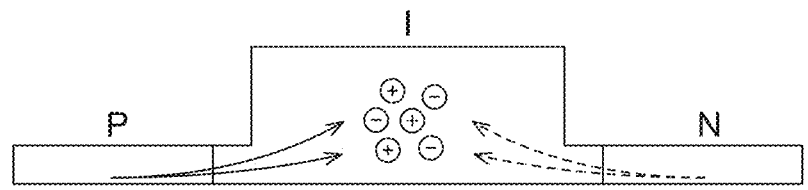
FIGS. 2A-2C schematically illustrate a PIN carrier injection, a reversed PN junction, and a MOS-type capacitor silicon photonic modulator, respectively.
Figure 2B:
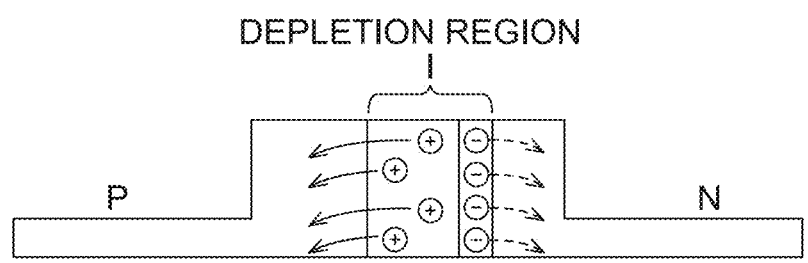
Figure 2C:
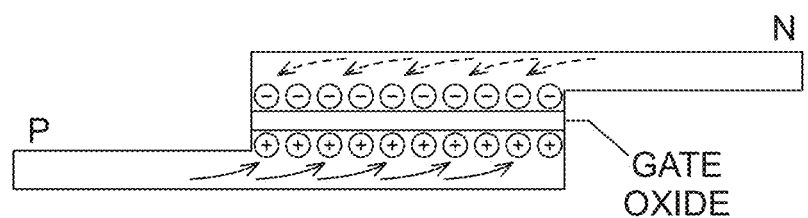

There are generally three types of silicon photonic modulators as illustrated in FIGS. 2A-2C: PIN structure using free carrier injection, reversed PN junction, and metal-oxidesemiconductor (MOS) type. Free carrier injection suffers high energy consumption due to the large recombination current and relatively low modulation speed caused by the free carrier lifetime. Most recent silicon modulators are almost exclusively based on reversed PN junctions in order to achieve low power consumption and high modulation speed. However, the maximum doping concentration can effectively only be up to ~$10^{18}$/cm$^3$ due to the dopant-induced scattering loss of the waveguides, which limits the E-O modulation efficiency. Therefore, reversed PN junction silicon photonic modulators usually require a long modulation length or a relatively high driving voltage. As a comparison, silicon photonic modulators driven by MOS-type capacitors, such as those of the present invention, can cause free carrier accumulation from a lightly doped silicon waveguide and may induce much stronger E-O modulation effect than reversed PN junctions. In addition, the process for fabricating MOS-type capacitors can be intrinsically compatible with CMOS fabrication processes and can offer better compatibility with CMOS electronics. Unfortunately, there has been little success with conventional MOS capacitor-driven silicon modulators.

Figure 3A:
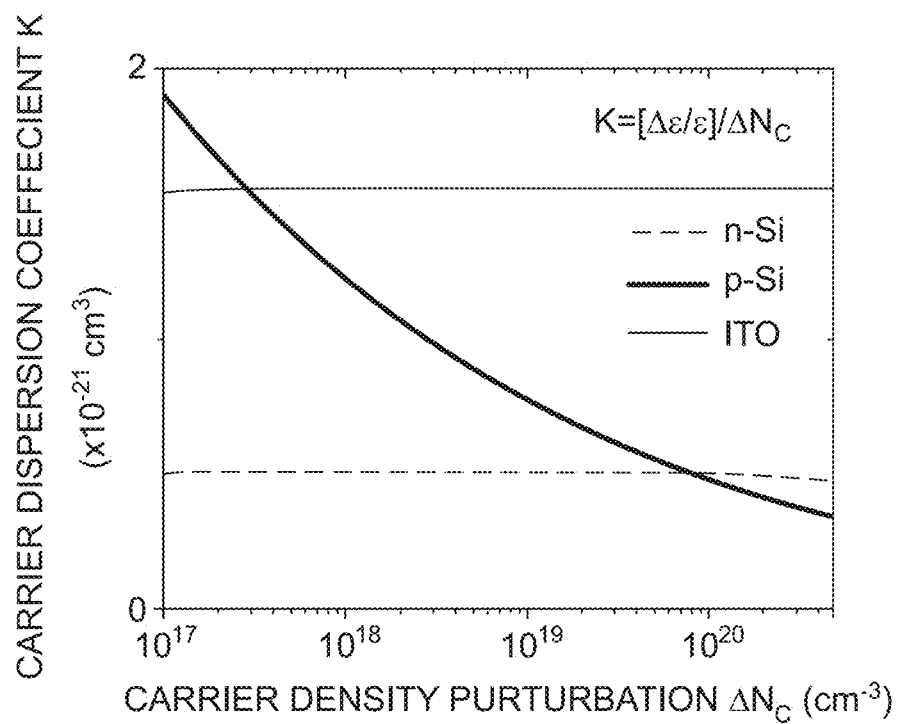
FIG. 3A illustrates a comparison of the carrier dispersion coefficient K of n-Si, p-Si and ITO.
Figure 3B:
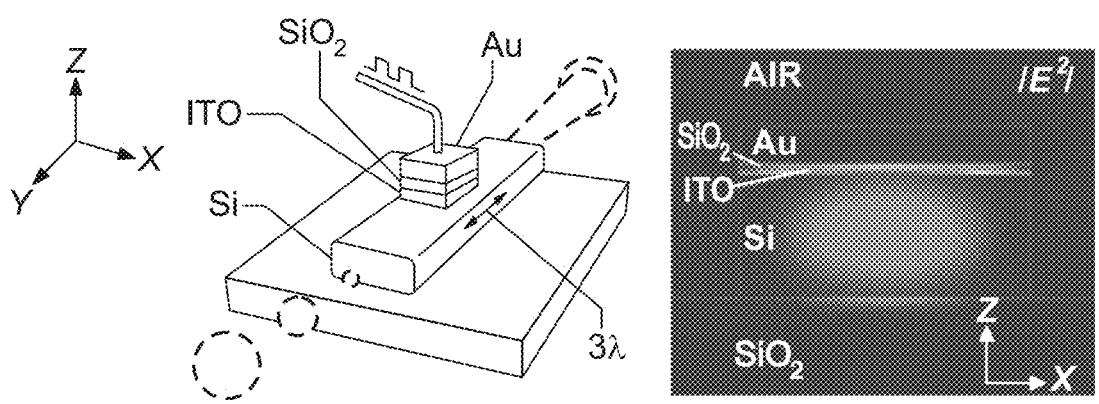
FIG. 3B schematically illustrates an exemplary configuration of a TCO MOS-driven waveguide modulator using hybrid Si-plasmonic waveguide.

To overcome the intrinsic drawback of the weak plasma dispersion effect of silicon, the present invention may integrate various functional materials, such as graphene, vanadium oxide, and ferroelectric materials, with silicon photonics to build E-O modulators, Table 1. Among these materials, TCOs are promising as a new type of plasmonic material and as active materials for E-O modulators due to the large tunability of their refractive indices. TCOs, such as indium-tin oxide (ITO) and aluminum-zinc oxide (AZO), are in a family of wide bandgap semiconductor oxide materials that can be degenerately doped to a high level. With free carrier concentrations ranging from $1\times10^{19}$ cm$^{-3}$ to $1\times10^{21}$ cm$^{-3}$, the real part n of the refractive index could experience more than 1 refractive index unit (RIU) change. For example, FIG. 3A compares the free carrier dispersion coefficient, which is defined as the relative permittivity change to the carrier density perturbation, of n-Si, p-Si and ITO. FIG. 3A shows that ITO possesses almost 3 × larger dispersion coefficient and a TCO/HfO$_2$/p-Si capacitor configuration should achieve ultra-high E-O efficiency.

Figure 3C:
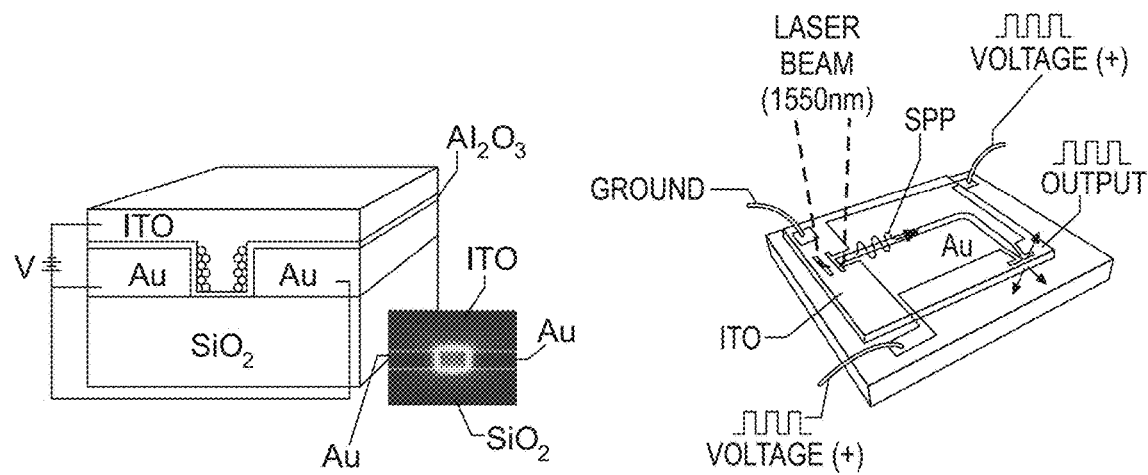
FIG. 3C schematically illustrates an exemplary configuration of a PlasMOStor modulator based on plasmonic slot waveguide.

A unique property called epsilon-near-zero (ENZ) has been verified with TCO materials. TCO electro-absorption (EA) modulators based on hybrid silicon-plasmonic waveguide (FIG. 3C) or plasmonic slot waveguide (FIG. 3C) have been demonstrated. However, these TCO EA modulators require the presence of metal gates for strong plasmonic light confinement, which introduces relatively high optical loss. In addition, switching TCO materials into ENZ requires a large change of the surface potential and the associated high driving voltage induces a strong electric field (>5 MV/cm) across the insulator layer, which is usually close to the breakdown strengths of the dielectric material of the MOS capacitor, which degrades the energy efficiency and causes the concern of long term reliability. Therefore, it is more desirable to develop low-voltage-driven micro-ring modulators relying on the resonance wavelength shifting as per the present invention.

Micro-Ring Based On-Chip WDM Optical Interconnect Benefits

Micro-ring resonators of the present invention can play a pivotal role in the success of silicon photonics as silicon enables micro-ring resonators of an unprecedented small size. Various silicon photonic devices such as add-drop filters, tunable filters, modulators, optical delay lines, and biosensors have already been developed. For on-chip WDM optical interconnects, micro-ring resonators can be configured to be either an optical modulator for E-O conversion or as an add/drop filter for wavelength MUX/DeMUX. Each optical ring resonator in the Tx module may serve simultaneously as the filters for DeMUX/MUX and modulators for E-O conversion, which can provide ultra-high areal bandwidth density. On the receiver side, the micro-ring resonators may serve as the wavelength filters for DeMUX to route the optical signals to the photodetectors.

Existing silicon micro-ring resonators as active devices typically use reversed PN junctions and usually possess E-O tuning efficiencies of only 10~40 pm/V, which is suitable for high-speed E-O modulation. However, the resonance wavelength λ of silicon micro-ring depends on process variations and temperature fluctuations that requires in-situ tuning and closed-loop compensations, which cannot be sufficiently compensated by the reversed PN junction structure and usually requires free carrier injection or thermal heaters. Free carrier injection and thermal tuning can induce much larger resonance wavelength tuning exceeding 100 pm/V or 120 pm/mW; nevertheless, the high-power dissipation at the steady state limits the application, especially for large scale parallel optical links where hundreds and even thousands of micro-rings are needed.

TABLE 1

Comparison of different active materials for hybrid integration with silicon photonics

| Materials | Representative materials | Device loss | E-O mechanism | Driving voltage | Modulation bandwidth | Integration process | Thermal stability |
|---|---|---|---|---|---|---|---|
| Group IV | n-Si | 10 dB (long device) | Plasma dispersion | VπL = 3.3 V cm | 10 Gb/s | Epi-growth | High |
| III-V compounds | InP, InGaAsP | 1 dB (short device) | Small Pockel, large plasma dispersion | VπL = 0.09 V cm | 32 Gb/s | Epi-growth | High |
| 2-D materials | Graphene | <1 dB | Bandgap and carrier tuning | 10 V | 30 GHz | Transfer or CVD | Medium (oxidation) |
| Ferroelectric materials | LiNbO$_3$ BaTiO$_3$ | <1 dB | 3.3 pm/V 213 pm/V | 5 V 1.5 V cm | 9 Gb/s 4.9 GHz | Transfer or MBE | High |
| E-O polymers | AJCKL1 | 15 dB | Pockel 147 pm/V | VπL = 0.1 V cm | 100 Gb/s | Spin coating | Low |
| Phase change materials | VO$_2$ | 2-10 dB | Phase change | <1 V | <1 GHz | Transfer | Medium |
| TCO materials | ITO | 10 dB (plasmonic) | Plasma dispersion | 2 V | 2.5 Gb/s | Sputtering | High |

MOS-Type Capacitor Design

In the present invention, high mobility TCO materials are preferred as such materials can significantly reduce the free carrier absorption loss. Various TCO materials including ITO, $In_2O_3$, high mobility CdO, and amorphous indium-gallium-zinc-oxide (a-IGZO) may be used as the capacitor gate material. The other important design feature is that of the insulator layer. In accordance with devices and structures of the present invention, different thicknesses of high-dielectric constant $HfO_2$ (5~20 nm) may be used as the insulator later and may be deposited by atomic layer deposition (ALD) to be evaluated for the balance of E-O efficiency and reliability.

Micro-Ring/Micro-Disk Resonator Design

Figure 4:
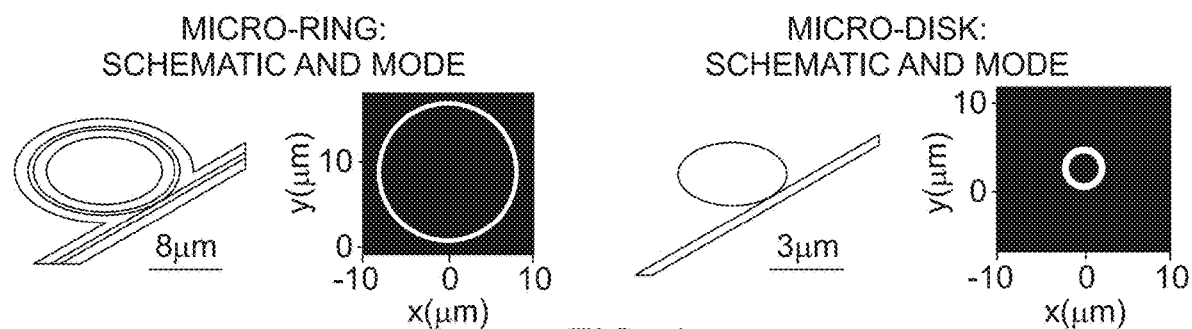
FIG. 4 schematically illustrates exemplary configurations of micro-ring and micro-disk resonators in accordance with the present invention and associated mode profile of micro-ring and micro-disk resonators.

Micro-rings and/or micro-disks may be provided in devices of the present invention, with micro-disks potentially achieving better energy efficiency due to the smaller mode volume as shown in FIG. 4. Exemplary designs of the present invention also seek to improve the overlap between the free carriers and the optical resonance mode.

Multi-Channel WDM Optical Transmitters

In FIG. 1C a N-channel (N=4) WDM optical transmitter in accordance with the present invention is illustrated, which is only limited by practical concerns such as the cascaded optical loss of the micro-rings to the bus waveguides and the number of available tunable lasers for testing. Greater or fewer than N=4 channels may be provided, such as 8-channel and 16-channel WDM optical transmitters, for example.

Discussion of Performance

Footprint: To balance the free-spectral range (FSR) which prefers a smaller radius, and the Q-factor of micro-ring resonators which prefers a larger radius, the radius of the micro-ring may be designed around 6 µm and the radius of the micro-disks around 3 µm. including the separation needed for each micro-ring or disk, the footprint of a single resonator may then be 15×15 µm². The total footprint of the exemplary 4-channel WDM module of FIG. 1D, including the driving electrodes, may be 100×100 µm² which can provide ultra-high packing density for integrated photonics.

Optical loss: For discrete photonic devices, the optical loss primarily comes from the fiber-to-grating coupler loss. The total coupling loss of devices of the present invention is expected to be controlled to around 6~8 dB. Our preliminary results show that TCO-based silicon photonic devices show negligible extra loss (<0.5 dB) compared with regular silicon photonic devices, which is attributable to an ultra-smooth surface from the TCO thin film, and a short electrode length resulting from the high E-O efficiency. For large-scale PICs, the cascaded optical losses from each resonator to the bus waveguide can play a critical role.

Energy Efficiency and Bandwidth: There is intrinsic trade-off between energy efficiency and bandwidth of micro-resonator modulators. We have developed a generalized model to evaluate the performance. Overall, the energy efficiency is determined by three key factors, which also adversely affect the bandwidth:

Purcell factor:

$$P = \frac{3}{4\pi^2}\left(\frac{\lambda}{n}\right)^3 \frac{Q}{V_m},$$

where g is the Q-factor, $V_m$ is the mode volume. A large Purcell factor increases the energy efficiency. From the simulation in FIG. 5A which we assume 100% overlap factor, we note that micro-disks can achieve higher Purcell factor and obtain ~100 aJ/bit energy efficiency. However, if a large Purcell factor is achieved through the increased Q-factor, it will induce longer photon lifetime that will decrease the bandwidth, FIG. 5A.

Capacitance: a large capacitance induces more charge and will improve the energy efficiency. Therefore, a high-K and thin insulator is preferred to improve the capacitance. However, a large capacitance will also increase the RC-delay and result in limited bandwidth.

Electro-optic field overlap factor α describes the overlapping between the free carrier distribution and the optical mode. When α equals to 1, the modulator reaches the maximum efficiency. To maximize the energy efficiency, α should be as large as possible. MOS-driven photonic devices usually suffer low α (~10%) because only the evanescent field is overlapping with the free carriers. Using subwavelength structures, in which TCO materials fill into the gaps between silicon nano-patches, a much higher α (~50%) should be achieved.

Figure 5A:
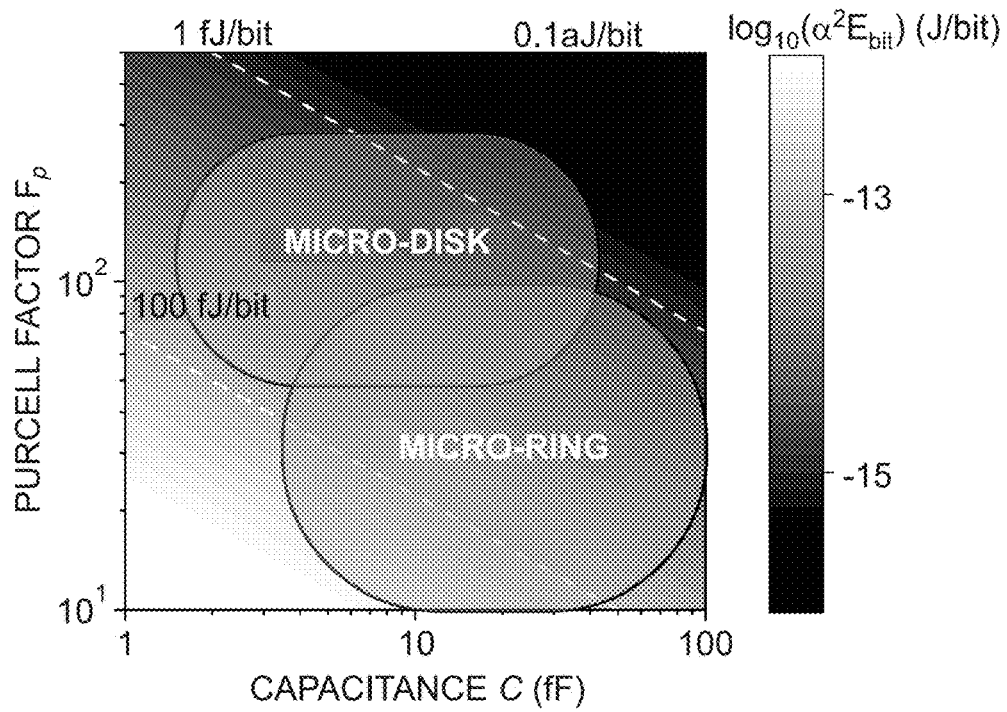
FIG. 5A illustrates simulated energy efficiency of a resonator-based silicon E-O modulator as a function of Purcell factor and capacitance with the assumption of perfect electro-optic field overlap for use in devices of the present invention.
Figure 5B:
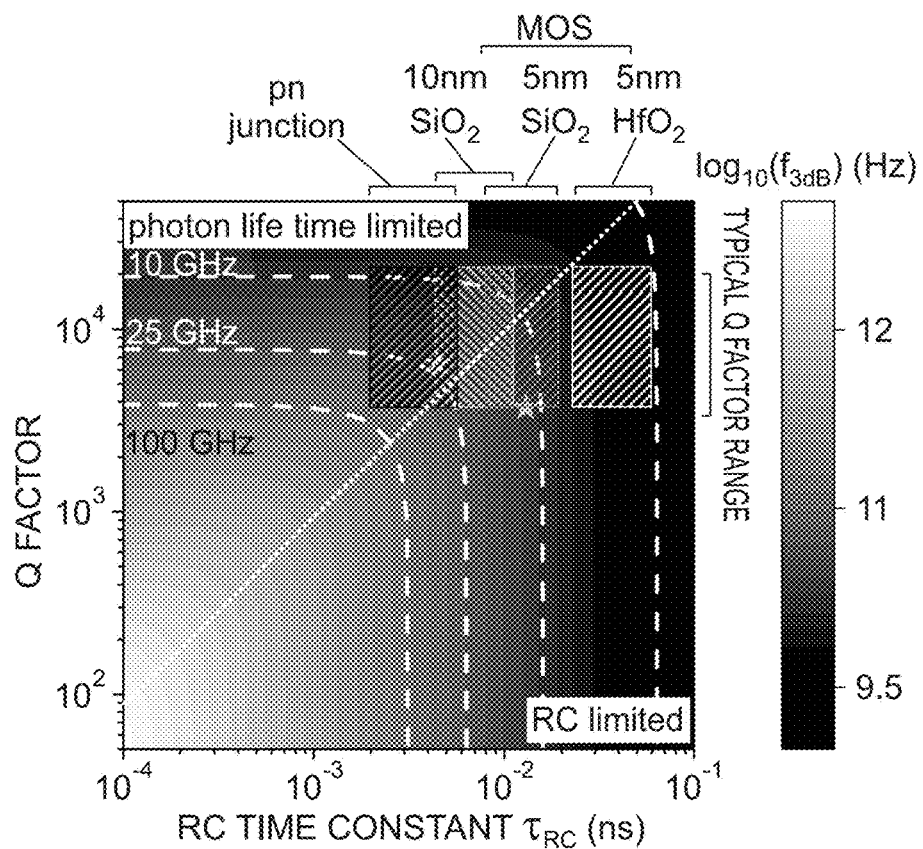
FIG. 5B illustrates simulated bandwidth determined by Q-factor and RC time constant.

Table 2 summarizes the proposed design of micro-ring/micro-disk resonators in accordance with the present invention, and conservatively estimates the performance according to the simulation in FIGS. 5A, 5B and the experimental results based on a reversed vertical PN junction of a Si micro-disk modulator. The system performance of the N-channel WDM transmitters is also included. Using the Si-TCO platform, we foresee not only better energy efficiency-bandwidth product, but also near-zero static power for temperature compensation compared with state-of-the-art silicon PICs.

TABLE 2

Expected Performance of the hybrid Si-TCO resonators and WDM module

| Si-TCO devices | Footprint (µm²) | Device loss | Q-factor | FSR | Wavelength Tunability (pm/V) | Wavelength range | Modulation bandwidth | Energy efficiency |
|---|---|---|---|---|---|---|---|---|
| Micro-ring resonator | R = 6 µm 15 × 15 | 0.5 dB | 5,000 | 2 THz | 1,000 | 4 nm | 25 Gb/s | 10 fJ/bit |
| Micro-disk resonator | R = 3 µm 10 × 10 | 0.5 dB | 8,000 | 4 THz | 800 | 4 nm | 25 Gb/s | 1 fJ/bit |

| WDM transmitter | Footprint (µm²) | Coupling loss | Device loss | Channel spacing | Athermal tolerance | Modulation scheme | Aggregate BW (Gb/s) | Areal BW density (Tb/s/mm²) |
|---|---|---|---|---|---|---|---|---|
| 1 × 4 | 100 × 100 | 6 dB | 2 dB | 200 GHz | 40K | OOK | 100 | 10 |
| | | | | | | PAM4 | 200 | 20 |

TABLE 2-continued

Expected Performance of the hybrid Si-TCO resonators and WDM module

| 1 × 16 transmitter | 100 × 500 | 6 dB | 10 dB | 100 GHz | 30K | OOK PAM4 | 400 1000 | 8 20 |
|---|---|---|---|---|---|---|---|---|

Figure 6A:
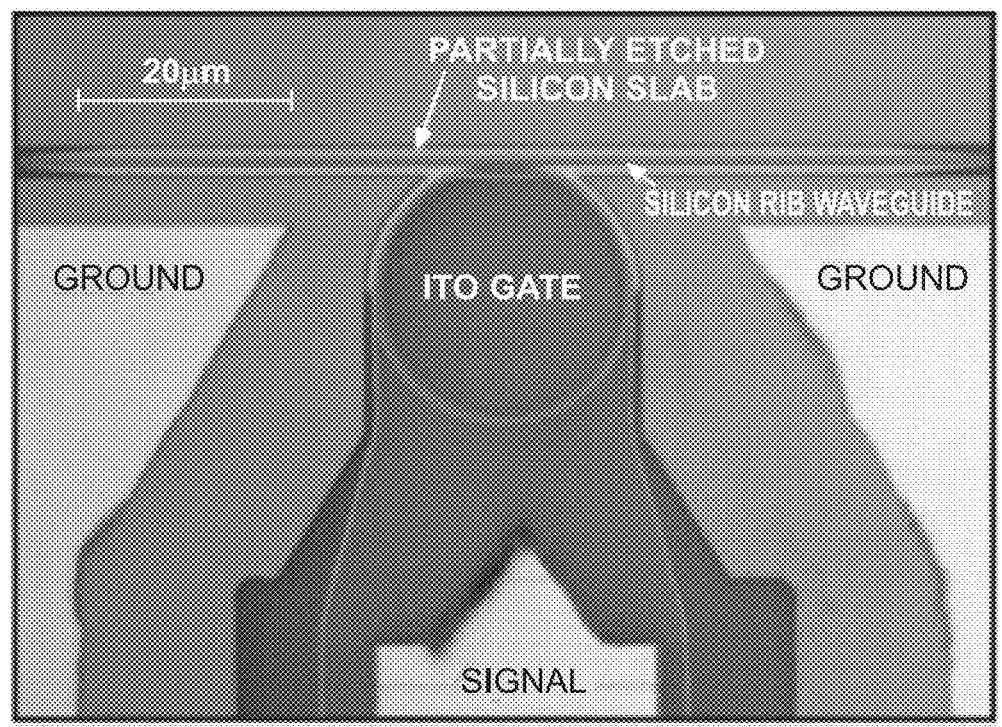
FIG. 6A illustrates an optical image of a hybrid Si-TCO micro-ring resonator as-fabricated in accordance with the present invention.
Figure 6B:
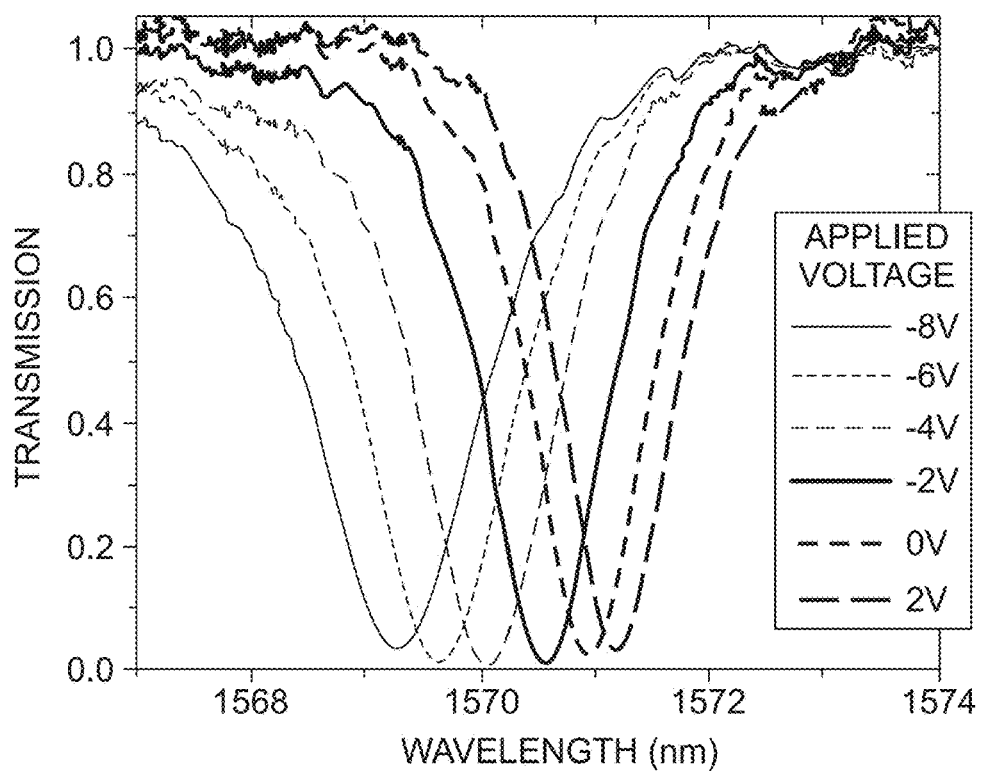
FIGS. 6B, 6C illustrate measured wavelength tuning of 270 pm/V and a switching time of 20 ns, respectively, for the device of FIG. 6A.
Figure 6C:
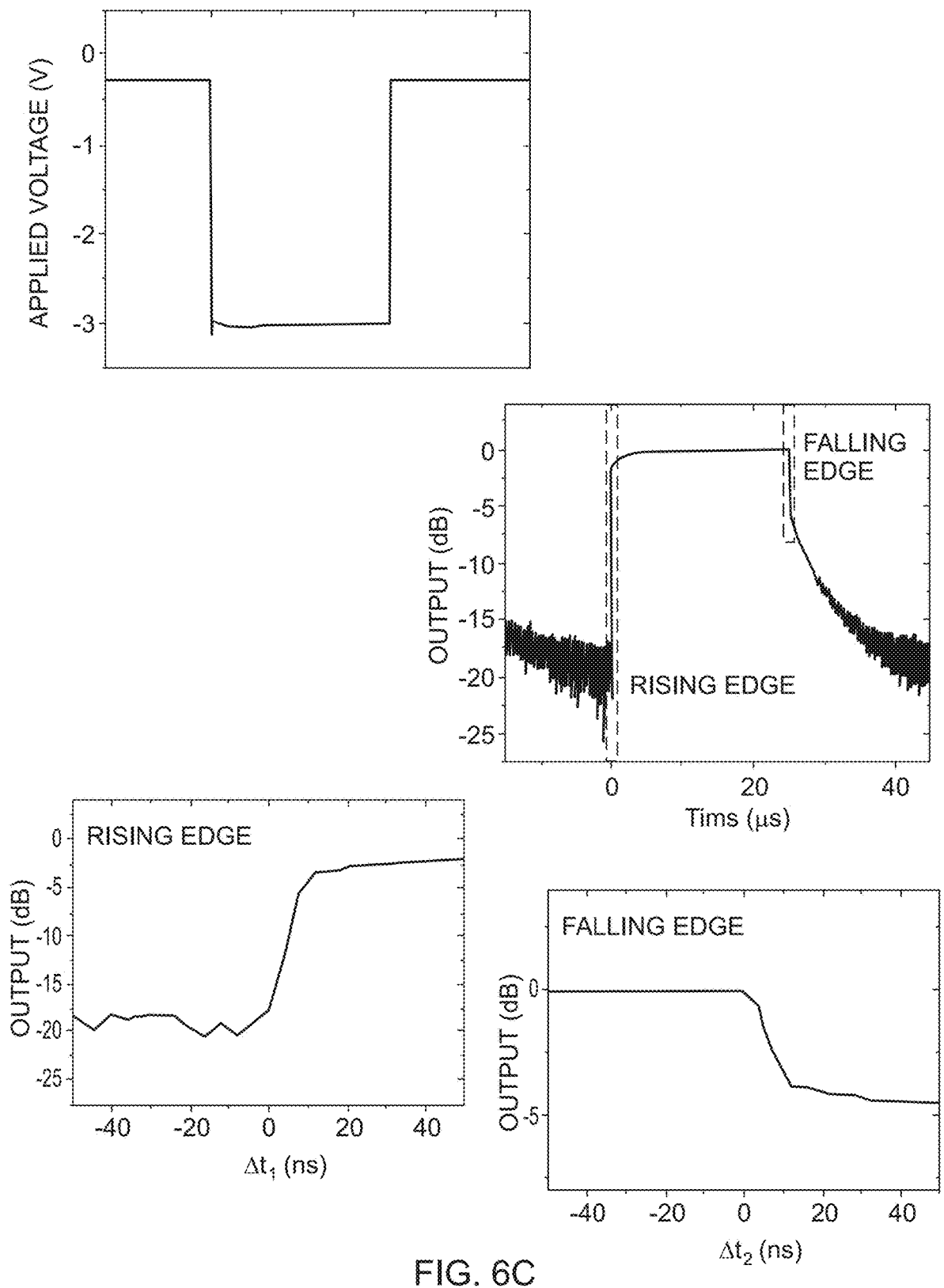

Gate-voltage-tuned Si-TCO micro-ring filter. The tunable micro-ring filter of the present invention may be driven by a hybrid Si-TCO MOS-type capacitor operating in carrier accumulation mode. Micro-ring resonators with 12 µm radius in accordance with the present invention were fabricated on a standard SOI wafer as shown in FIG. 6A. The same MOS-type capacitor with $In_2O_3$/16 nm $HfO_2$/p-Si was used to tune the resonance wavelength without any thermal heater. We experimentally achieved: i) 270 pm/V wavelength tunability through the gate voltage of FIG. 6B; ii) 2 nm shift of the resonant wavelength, which can compensate ~20 K temperature drifting; iii) switching time less than 20 ns FIG. 6C; and iv) near-zero (~0.2 pW) static power consumption resulting from the ultra-low leakage current.

Fundamental objectives of device physics of the hybrid Si-TCO micro-ring resonators of the present invention may include maximizing the E-O tunability (1,000 pm/V) and energy efficiency (1~10 fJ/bit) of the hybrid Si-TCO micro-ring/micro-disk resonators by investigating the fundamental design in device physics. We expect to compensate fabrication errors and temperature variation with near-zero static power dissipation to lock-in the operational wavelength over a 40K temperature variation. The approach of the present invention includes focusing on two deterministic factors of the micro-ring or micro-disk resonator: i) the capacitance density of the MOS-type capacitor and ii) the overlap factor of the modulated free carriers with the optical waveguide mode.

First, from the electrical perspective, the larger the capacitance density, the more free carrier density perturbation can be induced with a given gate voltage, and thus larger E-O tunability and energy efficiency. A MOS-type capacitor offers great freedom to control the capacitance density by controlling the thickness and dielectric constant of the gate oxide layer. Using a thin high-K material such as $HfO_2$ as the gate oxide layer, much larger capacitance density can be achieved compared with a conventional reversed biased Si PN junction. Besides, unlike a carrier-injection-based PIN diode, in which large carrier perturbation can also be achieved through heavy carrier injection, requiring large holding power consumption due to the forward bias, the static power consumption of a MOS-type capacitor is almost negligible. Second, optically, an efficient tuning of the micro-ring requires good overlapping of the accumulated carriers with the optical mode. For the hybrid TCO-silicon MOS-type capacitor configuration of the present invention, the carrier accumulation only happens at the ITO/oxide and silicon/oxide interfaces, which are away from the center of the optical mode. In order to improve the overlapping, multiple designs may be employed to achieve high overlapping factors.

In studying the device physics of the hybrid Si-TCO structure we look to Silvaco simulation as well as 3-D finite-difference time domain (FDTD) and finite-element analysis (FEA) simulation, both in TCO materials and MOS structure design.

Figure 7A:
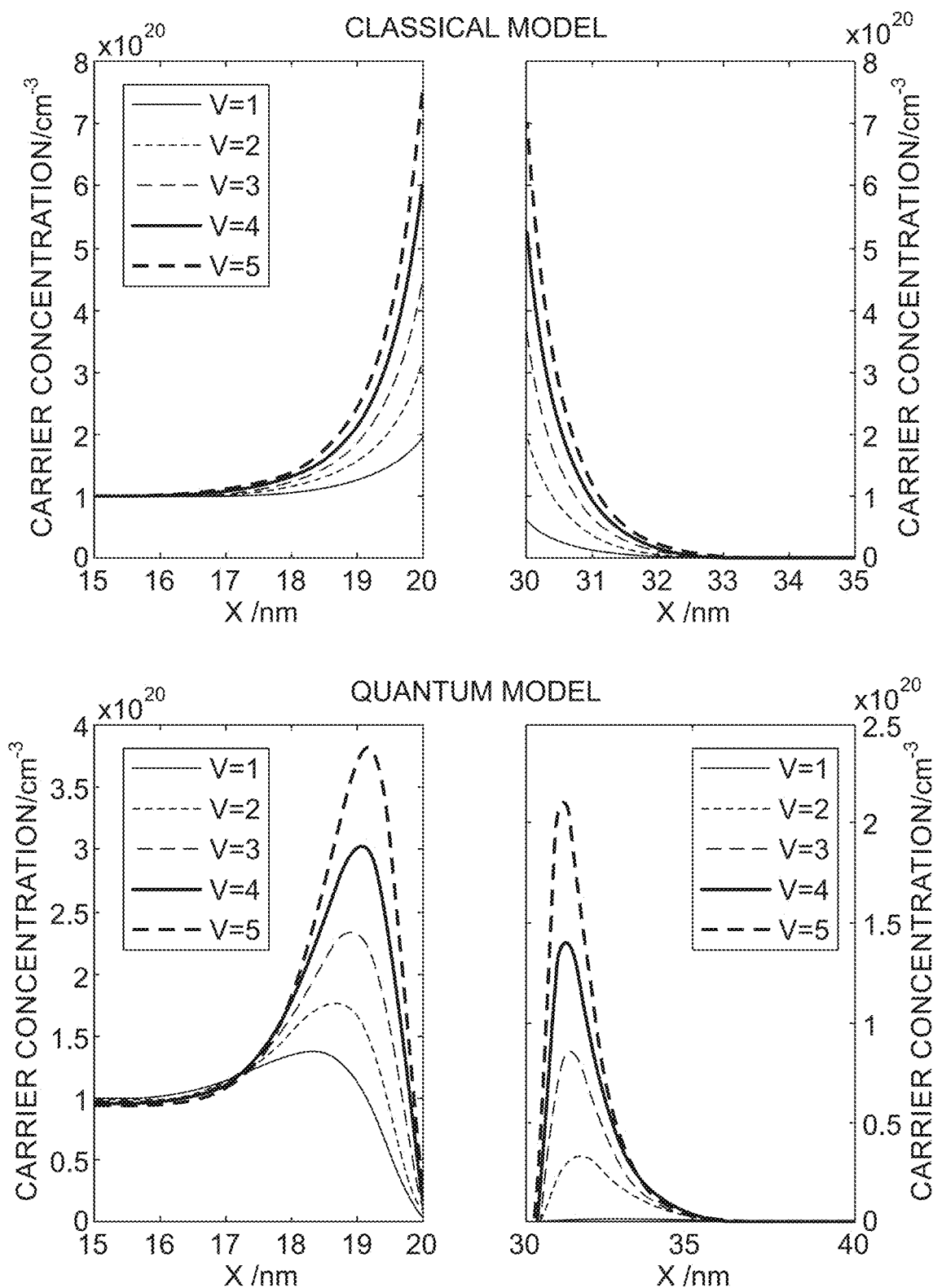
FIG. 7A illustrates a comparison of a Si-TCO MOS simulation using a classical and a quantum model.

For Silvaco simulation for the Si-TCO MOS structure, both a classical model and quantum model may be used to determine the free carrier distribution in silicon and a-IGZO. For example, FIG. 7A shows the free carrier distribution of 1-D ITO/$HfO_2$/p-Si MOS-type capacitor under different bias using classical and quantum models. A thin depletion layer is formed at the interface of the insulator using quantum model; however, the thickness of the accumulation layer is also expanded. The free carrier distribution of the 3-D MOS structure may be investigated in real devices.

Figure 7B:
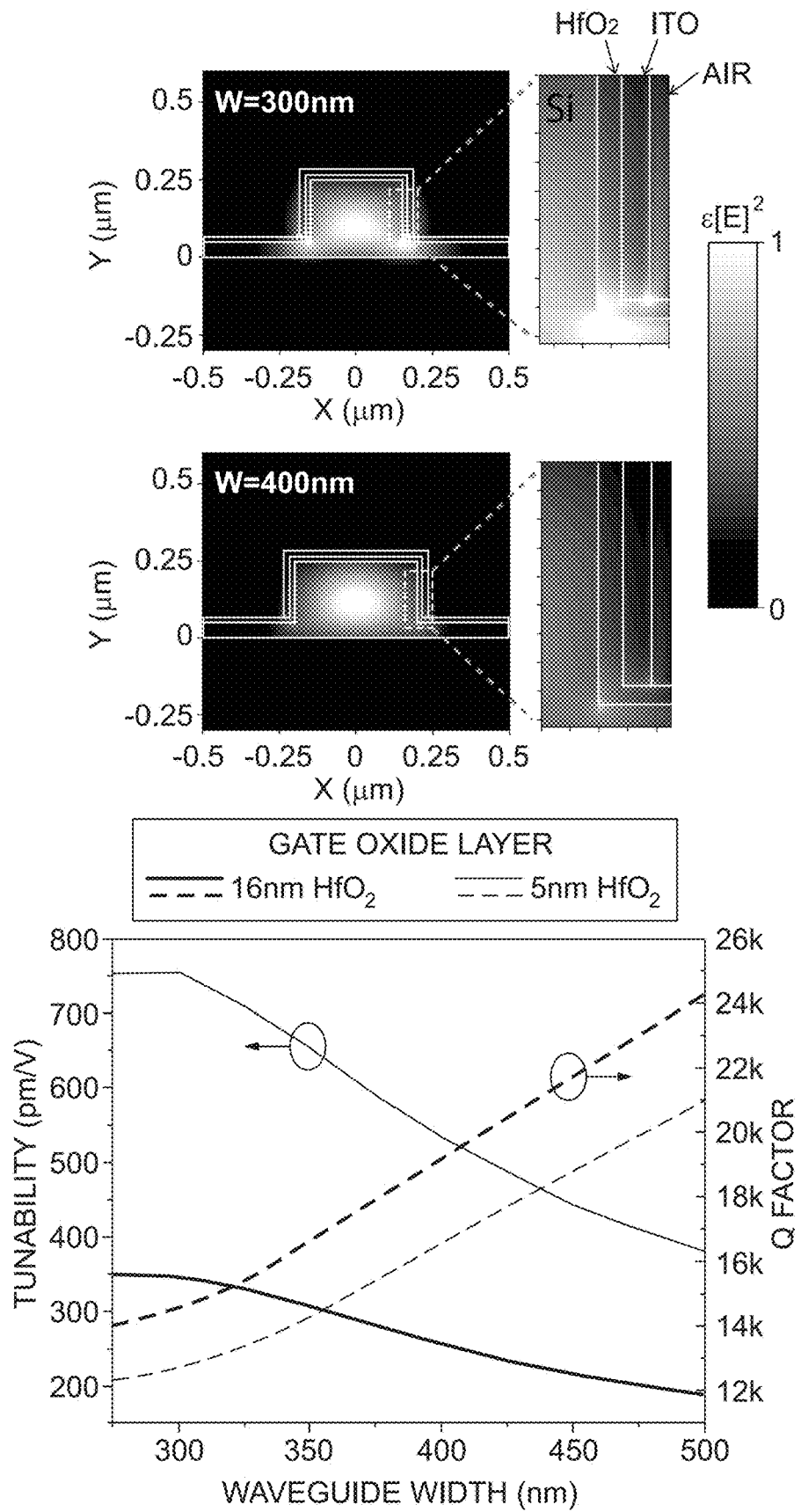
FIG. 7B illustrates an optical mode simulation of micro-ring resonators in accordance with the present invention with different waveguide width and simulated E-O tunability and Q-factor.

For 3-D finite-difference time domain (FDTD) and finite-element analysis (FEA) simulations, the micro-ring and micro-disk may be optimized by 3-D FDTD and FEA simulation using Rsoft by Synopsys, Inc. and Lumerical by Lumerical Inc. Design of the hybrid Si-TCO resonators in passive state with zero bias may first be optimized to achieve the desired Q-factors. After that, the dynamic light-matter interaction incorporating the free carrier distribution may also be conducted. FIG. 7B shows the simulated 6 µm radius micro-ring resonator mode with 300 nm and 400 nm waveguide width. Clearly, using a narrower waveguide enhances the evanescent field and result in higher E-O efficiency. However, the Q-factor is also sacrificed due to higher radiation loss as simulated in FIG. 7B.

Figure 7C:
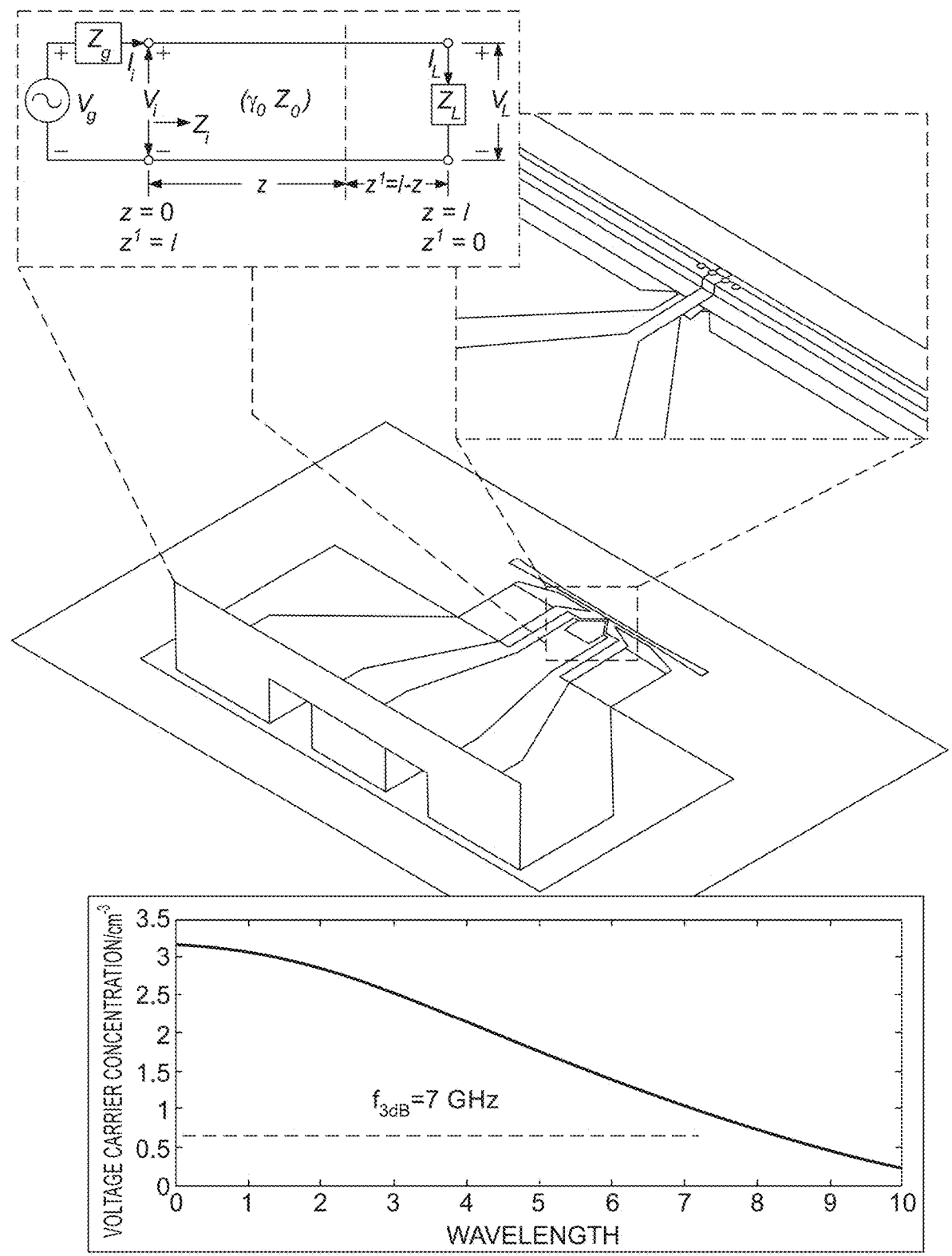
FIG. 7C illustrates a HFSS modeling of the high-speed RF response from micro-ring resonators of the present invention.

HFSS simulation of high-speed RF response as illustrated in FIG. 7C may be investigated the E-O modulation from both device and circuit levels. First, HFSS by ANSYS, Inc. may be used to extract the capacitance and resistance of the micro-ring, which is frequency dependent due to the carrier mobility and skin effects. Second, the equivalent RC model may be used to replace the micro-ring, and integrate the RC element with transmission line electrodes, which have 50 Ω characteristic impedance. Especially as shown in FIG. 1B, the length of the wavelength tuning electrode and high-speed E-O modulation electrode need to be specified to balance the wavelength tuning range and the energy efficiency.

Figure 8A:
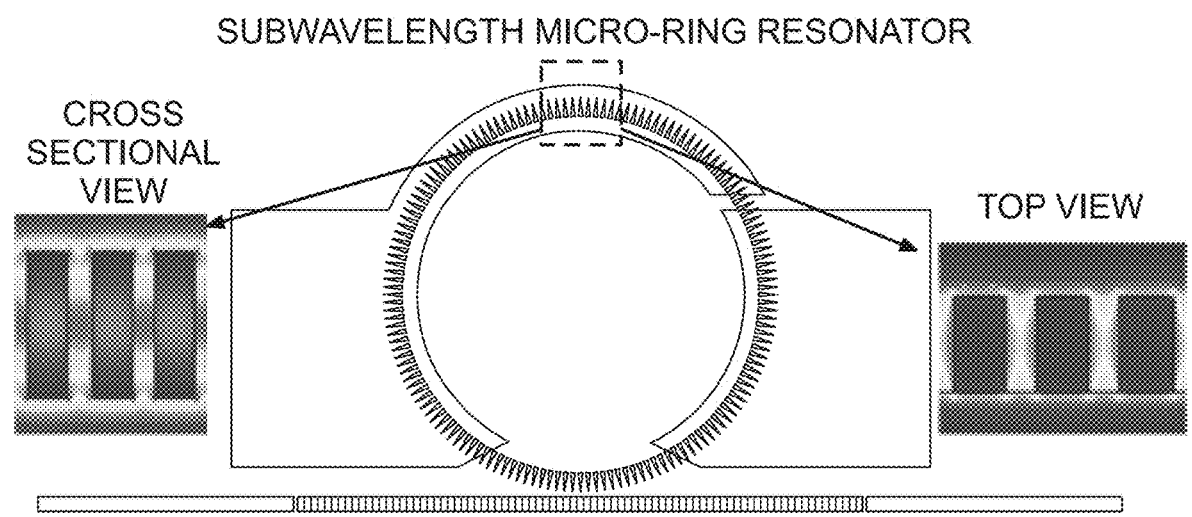
FIGS. 8A, 8B schematically illustrate exemplary configurations of a SWG micro-ring and a micro-disk resonator, respectively, in accordance with the present invention.
Figure 8B:
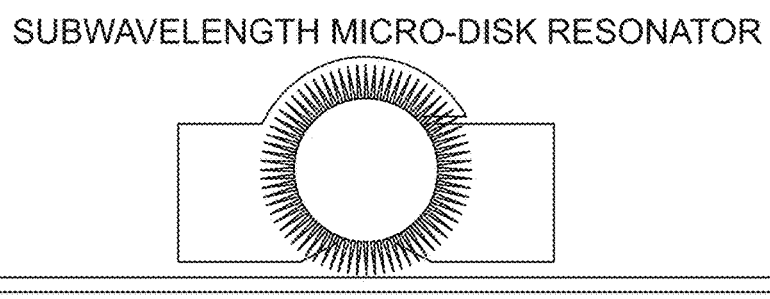

The subwavelength grating waveguide may also be created for extremely high E-O tuning efficiency. For instance, improving the overlap factor between the accumulated free carriers and waveguide mode by narrow waveguide will inevitably degrade the Q-factor. To achieve the E-O tunability above 1,000 pm/V and energy efficiency below 1 fJ/bit, subwavelength grating (SWG) based waveguides and photonic devices may be used. The SWG waveguide may include periodic silicon pillars in the propagation direction with a period much smaller than the operating wavelength. Within such a structure, the wave propagates in a similar way to conventional strip waveguides, but the interaction region between light and the cladding materials, which may be TCO materials per the present invention, may be greatly extended compared to traditional SOI waveguides based on evanescent wave interaction. In this respect, exemplary SWG micro-ring and micro-disk resonators in accordance with the present invention may be designed as shown in FIGS. 8A, 8B. Preliminary simulation shows the overlap factor can be improved from 10% of traditional SOI waveguides to 50% of SWG waveguides. The subwavelength gaps may be filed with TCO materials.

Athermal micro-ring/micro-disk resonators in accordance with the present invention are expected to be capable of 25 Gb/s high-speed E-O modulation with 1~10 fJ/bit energy efficiency over 40K temperature variation, while seeking a balance between energy efficiency and bandwidth. High-speed operation may be achieved through optimization of the RC-delay. In this regard, high quality, high mobility TCO materials may be provided through DC- and RF-sputtering from which prototype dual-functional micro-ring resonators may be fabricated. Discrete Si-TCO micro-resonators may demonstrate both high-speed E-O modulation and athermal operation.

High quality, high mobility TCO materials deposition and characterization for most representative TCO materials and integration with silicon photonics are summarized below:

ITO: polycrystal with some scattering loss, relatively low mobility (15~20 $cm^2/V \cdot s$), but high conductivity(1.3× $10^4$ S/cm), suitable for high-speed E-O modulator;

$In_2O_3$: polycrystal, moderate mobility (40 $cm^2/V \cdot s$) and conductivity, suitable for balanced performance between energy efficiency and bandwidth;

a-IGZO: amorphous with atomic level smoothness, moderate mobility (30~40 $cm^2 V \cdot s$) and large range of carrier concentration ($10^{16}$~$10^{20} cm^{-3}$), perfect for high dynamic range tunable optical filters; and CdO: ultra-high carrier mobility (>200 $cm^2/V \cdot s$), suitable for high Q-factor optical filters and ultra-energy efficient modulators.

Figure 9A:
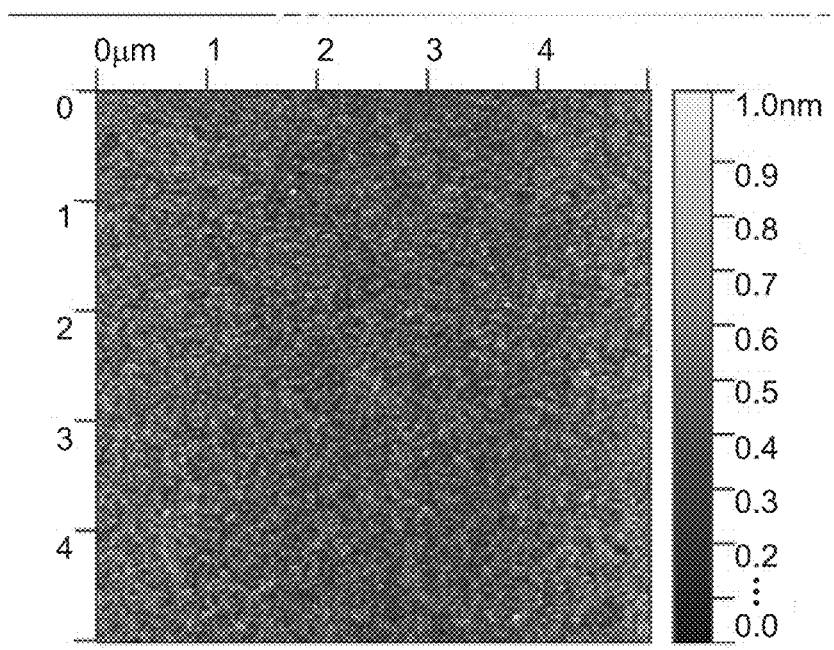
FIG. 9A illustrates AFM measurement of sputtered a-IGZO thin film showing atomic level smoothness.
Figure 9B:
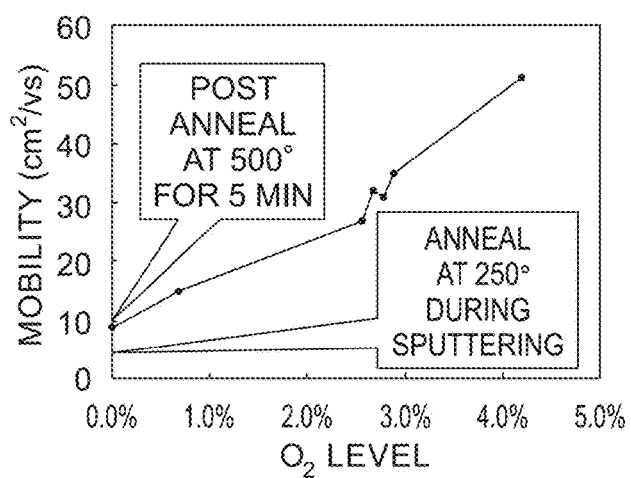
FIGS. 9B, 9C illustrate free carrier mobility of an ITO thin film and permittivity measurement using ellipsometer, respectively.
Figure 9C:
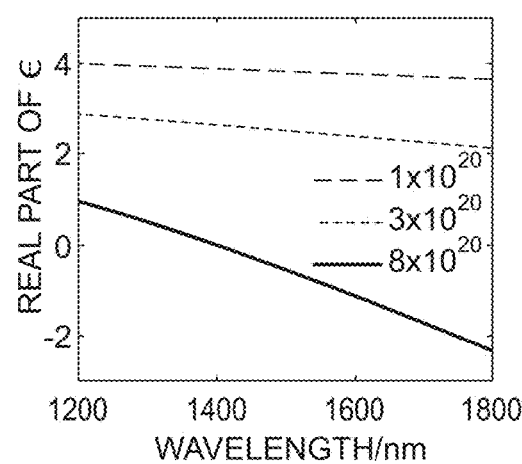

Sputtering may be used for TCO film deposition with good thickness uniformity and controllability over a wide range of substrate types and sizes. Additionally, sputtering can offer better compositional control than thermal or e-beam evaporation. An AJA International ATC Orion Series Sputtering System may be used for the deposition of TCO films. FIG. 9A shows that the deposited a-IGZO film has 0.3 nm roughness obtained by the atomic force microscopy (AFM) measurement. The Hall Effect can be used to determine carrier type, concentration, and mobility of the TCO films. Lowering the oxygen flow during the sputtering process can increase the oxygen vacancy, and hence increase the free carrier concentration. Co-annealing during the deposition can further increase the free carrier concentration. FIG. 9B shows the measured carrier concentration and mobility as a function of the $O_2$ level. An ellipsometer may also be used to measure the dielectric constants of the TCO films based on the Drude model. An example of ITO measurement with different free carriers is shown in FIG. 9C.

Device fabrication and characterization may be performed involving athermal testing and high-speed E-O modulation. The hybrid Si-TCO micro-ring resonators may be fabricated, for example, by the processes disclosed in our prior publications. (E. Li, Q. Gao, R. T. Chen, and A. X. Wang, "Ultracompact Silicon-Conductive Oxide Nanocavity Modulator with 0.02 Lambda-Cubic Active Volume," Nano Lett. 18, (2018). Li, E., Gao, Q., Liverman, S. and Wang, A. X., 2018. One-volt silicon photonic crystal nanocavity modulator with indium oxide gate. *Optics letters*, 43(18), pp.4429-4432. E. Li, B. Ashrafi Nia, B. Zhou, A. X. Wang, "Transparent Conductive Oxide-Gated Silicon Microring with Extreme Resonance Wavelength Tunability," Photonics Research, Mar. 26, 2019. The contents of each of the foregoing are incorporated herein by reference.). Testing may be conducted as follows:

Static optical characterization: the transmission spectra of the micro-ring resonators may be measured at a telecommunication wavelength range to obtain the Q-factor and temperature dependence. At the working wavelength, the optical loss, extinction ratio, and leakage current may be characterized. For the athermal testing, the device may be placed on a temperature-controlled hot plate and the bias voltage used to compensate for temperature variations from room temperature to 80° C.

Low speed E-O performance: The capacitance and resistance of the micro-ring/micro-disk resonators may be characterized by a probe station Alessi REL-4800, which can provide both AC (~1 MHz) and DC C-V measurement. Low-speed (<100 MHz) E-O modulation can be directly implemented using a digital function generator and micro-probe station. The optical and E-O characterization results may be used to evaluate the design and fabrication and provide feedback and optimization. We expect 3~5 rounds of iteration in order to achieve the target performance.

High-speed and RF modulation: To efficiently deliver the high frequency driving signals, the modulator may have 50Ω impedance to match the RF source and the cables. The series resistance may be optimized through doping concentration to obtain the minimum S11 at the desired frequency of 15 GHz bandwidth for 25 Gb/s data rate. A high-speed E-O modulator characterization system including 40 Gbps PRBS generator, 30 GHz digital communication analyzer, 26.5 GHz microwave source and spectrum analyzer, and 40 GHz Cascade Microtech RF probe system has been built.

Hybrid integration with AIM Photonics foundry may be performed to verify process compatibility with silicon photonics and to explore hybrid Si-TCO integration for future scalable manufacturing. For instance, a hybrid Si-TCO of the present invention may be fabricated by combining AIM Photonics 3 μm passive SOI MPW runs and TCO processes. The fabrication can thus take advantage of mature passive silicon PIC processes to produce low optical loss, high quality micro-ring and micro-disk resonators, while still allowing integration of TCO materials, which are currently not available by commercial foundry service, with silicon photonics for enhanced performance.

For regular micro-rings and micro-disks, AIM Photonics PDK—Passive Silicon Photonics Process may be used for integration of hybrid Si-TCO photonic devices. Devices with narrow waveguides and SWG design as discussed above may be fabricated using a custom designed mask by providing the GDS II data for layout. After fabrication, the passive silicon photonic devices are fabricated and ion implantation performed. The entire proposed fabrication process flow is indicated in FIGS. 10A-10F.

To demonstrate the potential of hybrid Si-TCO as a platform for future extreme-scale optical interconnects multi-channel, WDM transmitters may be implemented using dual-functional micro-ring resonators. The multi-channel WDM transmitters may be extended to the receiver end as well through the integration with Ge photodetectors. 4-channel, 8-channel, and 16-channel on-chip WDM transmitters in accordance with the present invention may be designed and fabricated by combing AIM Photonics passive PIC processes and TCO fabrication. Characterization of multi-channel WDM transmitters, e.g. on-chip WDM module, may demonstrate temperature independent operation up to 40K temperature variation by the gate-voltage tuning and provide aggregated high-speed E-O modulation of 4×25 Gb/s=100 Gb/s with energy efficiency exceling existing silicon photonics by 10×.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. An electrically tunable silicon-transparent conductive oxide device, comprising a resonator structured as a micro-ring or a micro-disk, the resonator having both a wavelength tuning electrode and a high-speed E-O modulation electrode operably coupled thereto, wherein the device comprises a MOS-type TCO/HfO$_2$/p-Si capacitor operably connected to the resonator at a location to electrically drive the resonator.

2. The device of claim 1, comprising a voltage source electrically coupled to the wavelength tuning electrode, the voltage source configured to provide a DC bias or slow varying control signal thereto.

3. The device of claim 1, comprising a driving circuit electrically coupled to the high-speed E-O modulation electrode, the driving circuit configured to provide a driving signal to the high-speed E-O modulation electrode.

4. The device of claim 3, wherein the driving circuit is a function generator or a integrated circuit driver.

5. The device of claim 1, wherein the TCO is one or more of In$_2$O$_3$, ITO, Ti:In$_2$O$_3$, Mo:In$_2$O$_3$, CdO, IGZO, and AZO.

6. The device of claim 1, wherein an E-O tuning efficiency of the resonator is at least 1,000 pm/V.

7. The device of claim 1, wherein the resonator has an E-O modulation speed of at least 25 Gb/s.

8. The device of claim 1, wherein the resonator has an energy efficiency of at least 1 fJ/bit.

9. A multi-channel wavelength division multiplexer comprising a silicon bus waveguide optically coupled to a plurality of the devices of claim 1.

10. The multi-channel wavelength division multiplexer of claim 9, comprising a plurality of optical input channels optically coupled to an input of the wavelength division multiplexer, each optical input channel having a selected optical wavelength associated therewith.

11. The multi-channel wavelength division multiplexer of claim 9, wherein each one of the resonators is operably connected to a respective driving circuit, each respective driving circuit tuned to a respective one of the selected optical wavelengths of the optical input channels.

12. The multi-channel wavelength division multiplexer of claim 9, wherein the wavelength division multiplexer is disposed on a single chip.

* * * * *

UNITED STATES PATENT AND TRADEMARK OFFICE
CERTIFICATE OF CORRECTION

PATENT NO. : 11,119,272 B2
APPLICATION NO. : 17/069920
DATED : September 14, 2021
INVENTOR(S) : Alan Xiaolong Wang and Erwen Li It is certified that error appears in the above-identified patent and that said Letters Patent is hereby corrected as shown below:

In the Specification

Figure 10A:
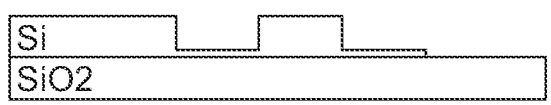
FIGS. 10A-10F schematically illustrate fabrication processes of hybrid Si-TCO devices of the present invention.
Figure 10B:
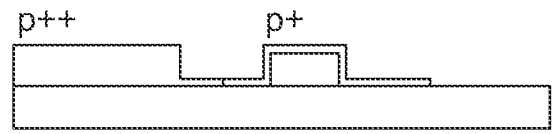
Figure 10C:
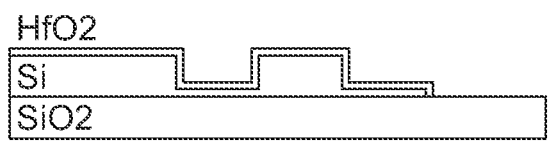
Figure 10D:
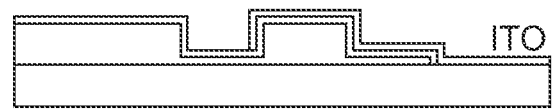
Figure 10E:
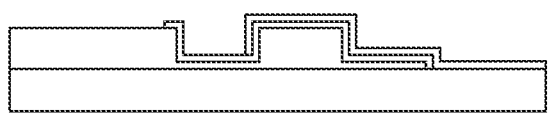
Figure 10F:
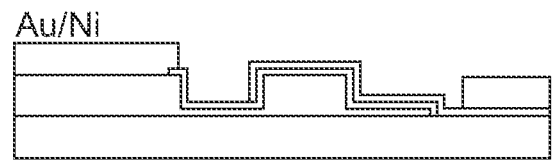

Column 4, Line 17 at the end after invention add the text:
--, in which Fig. 10A shows silicon waveguides, microrings, and grating couplers fabricated by AIM photonics MPW passive PIC processes; Fig. 10B shows active regions and contact regions selectively implanted to equivalent dopant concentrations of $5 \times 18 cm^3$ and $1 \times 20 cm$ at a top $50nm^{-3}$ thick silicon layer with, after implantation, the dopant activated by rapid thermal annealing; Fig. 10C shows a 10nm thick $HfO_2$ layer deposited using atomic layer deposition (ALD); Fig. 10D shows an ITO gate layer patterned by EBL with 20nm of ITO RF sputtered, followed by a liftoff process with the sample then treated with $O_2$ plasma to increase the carrier concentration; Fig. 10E shows the $HfO_2$ at silicon contact region removed by buffered HF; and, Fig. 10F shows a 5nm Ni/ 200nm Au electrode patterned to form ohmic contact on both p- silicon and ITO--.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*